(12) United States Patent
Kelly

(10) Patent No.: US 11,635,676 B2
(45) Date of Patent: Apr. 25, 2023

(54) IMAGE-PROJECTOR ACCESSORY-ATTACHMENT ADAPTER

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

(\*) Notice: Subject to any disclaimer, the term of this patent is extended or adjusted under 35 U.S.C. 154(b) by 74 days.

(21) Appl. No.: 17/384,723

(22) Filed: Jul. 24, 2021

(65) Prior Publication Data

US 2022/0035232 A1 Feb. 3, 2022

Related U.S. Application Data

(60) Provisional application No. 63/059,824, filed on Jul. 31, 2020.

(51) Int. Cl.
*G03B 21/54* (2006.01)
*G03B 21/14* (2006.01)
*G03B 21/16* (2006.01)

(52) U.S. Cl.
CPC .......... *G03B 21/54* (2013.01); *G03B 21/145* (2013.01); *G03B 21/16* (2013.01)

(58) Field of Classification Search
CPC ....... G03B 21/54; G03B 21/145; G03B 21/16
See application file for complete search history.

(56) References Cited

U.S. PATENT DOCUMENTS

| | | | |
|---|---|---|---|
| 6,416,184 B1 * | 7/2002 | Arai ................... | G03B 21/16 349/5 |
| 2005/0259230 A1 * | 11/2005 | Yang ................... | G03B 11/06 353/97 |
| 2006/0114431 A1 * | 6/2006 | Ushiro ................ | G03B 21/145 348/E5.137 |
| 2007/0024826 A1 * | 2/2007 | Gilbert ................ | G03B 21/14 353/122 |
| 2007/0242236 A1 * | 10/2007 | Sugiura .............. | G03B 21/145 353/85 |

\* cited by examiner

*Primary Examiner* — Bao-Luan Q Le
(74) *Attorney, Agent, or Firm* — Kurt L. VanVoorhies

(57) ABSTRACT

An accessory may be attached to image projector via an associated accessory-interface structure, the latter of which is operatively coupled to at least one projector-attachment structure that extends through an opening in a front panel of the projector so as to provide for clamping the accessory-interface structure to the front panel of the image projector.

28 Claims, 16 Drawing Sheets

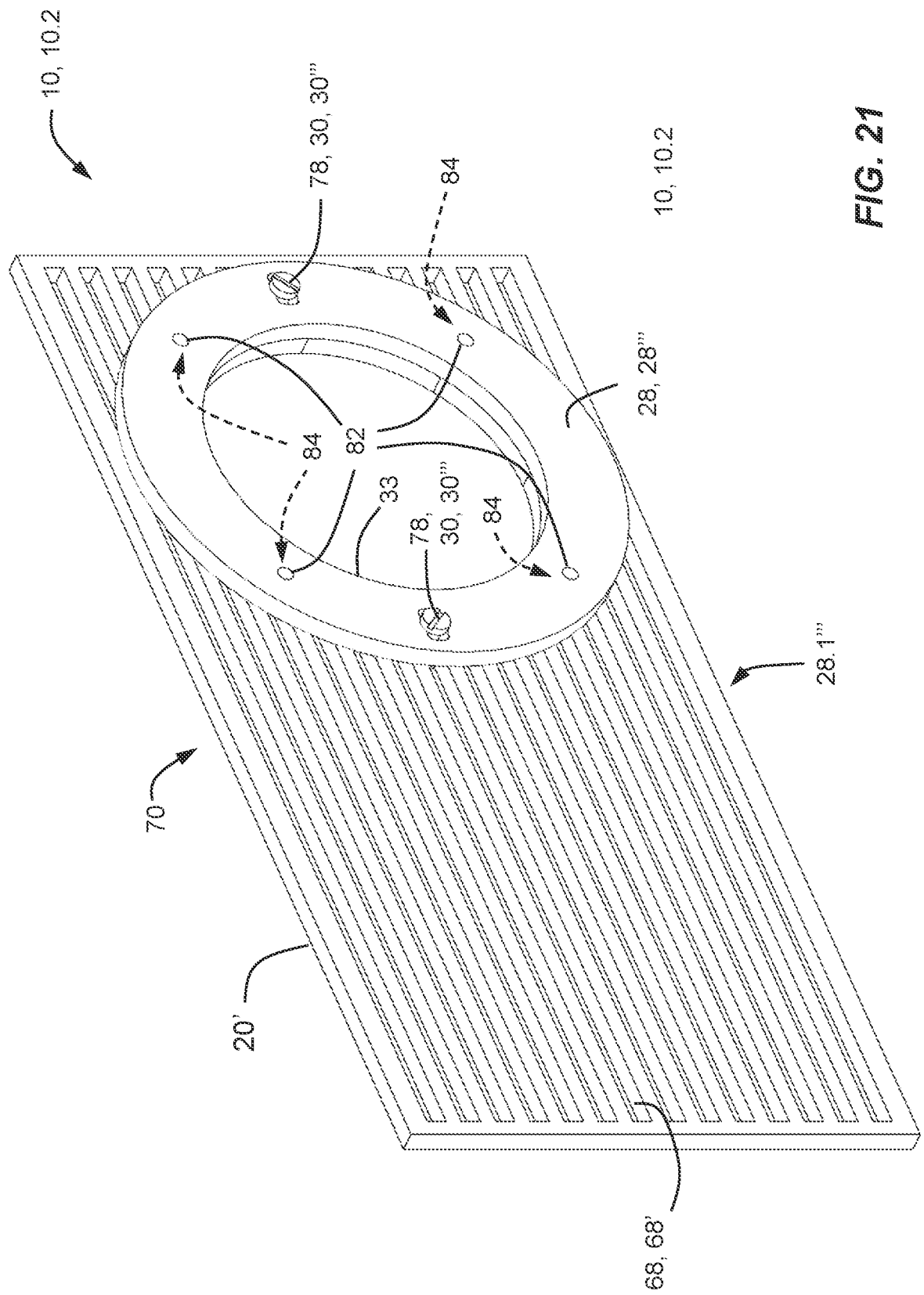

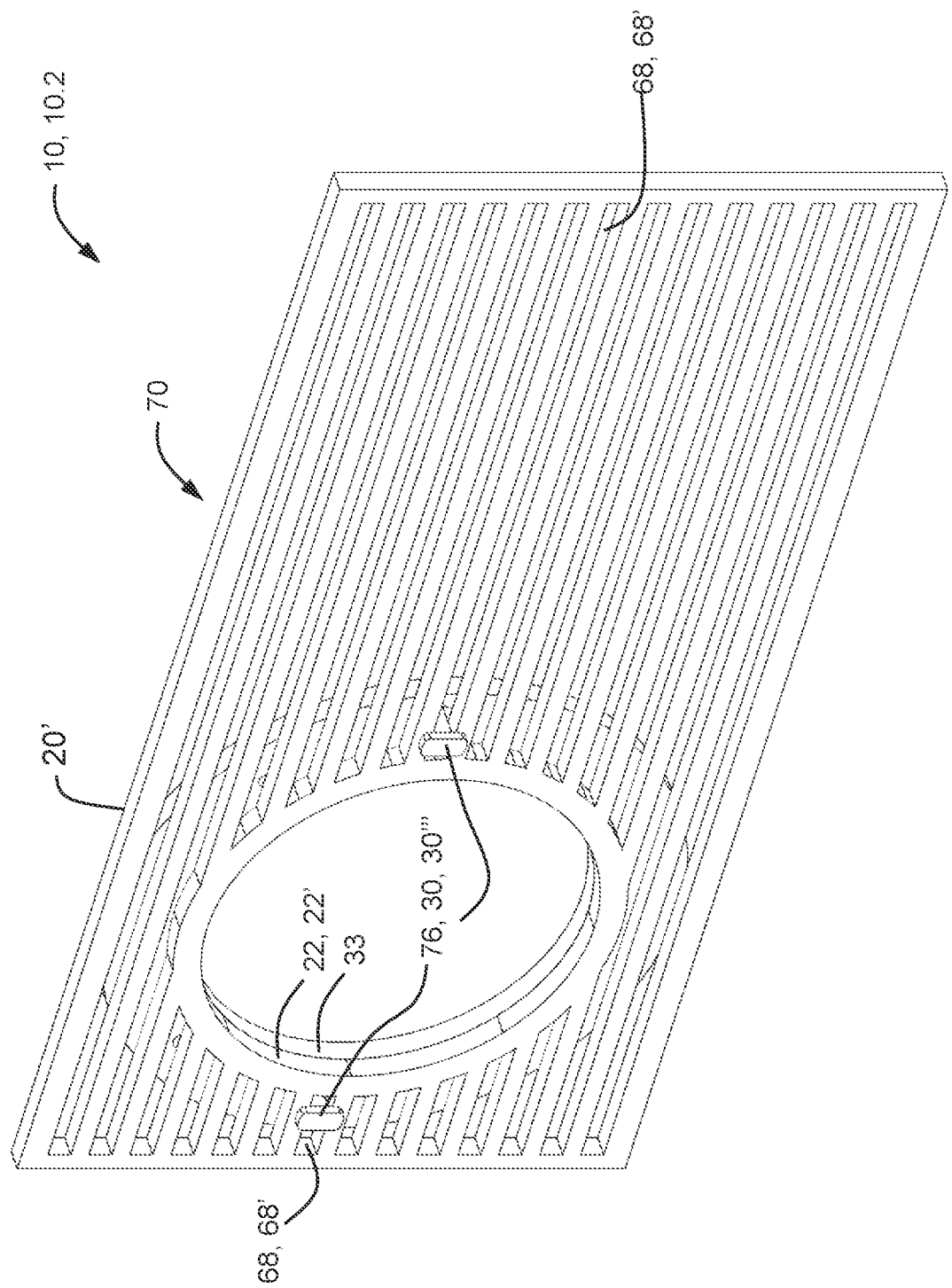

US 11,635,676 B2

IMAGE-PROJECTOR ACCESSORY-ATTACHMENT ADAPTER

CROSS-REFERENCE TO RELATED APPLICATIONS

The instant application claims the benefit of prior U.S. Provisional Application Ser. No. 63/059,824 filed on 31 Jul. 2020, which is incorporated herein by reference in its entirety.

BRIEF DESCRIPTION OF THE DRAWINGS

FIG. 21 illustrates an isometric view from an oblique front perspective of the second-aspect image-projector accessory-attachment adapter illustrated in FIG. 19, in cooperation with an associated front housing of an image projector; and FIG. 22 illustrates an isometric view from an oblique rear perspective of the second-aspect image-projector accessory-attachment adapter illustrated in FIGS. 19 and 21, in cooperation with an associated front housing of an image projector.

DESCRIPTION OF EMBODIMENT(S)

Figure 1:
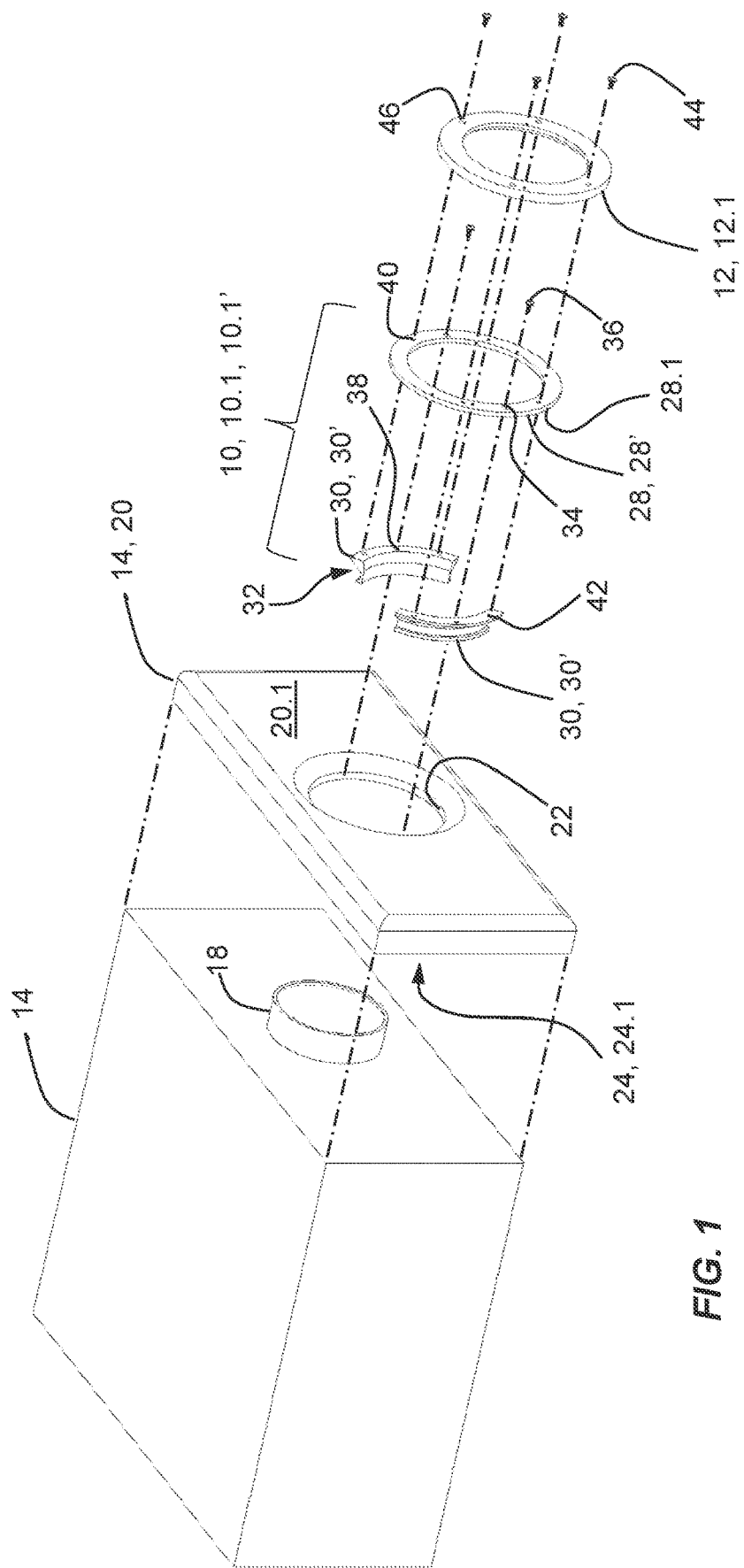
FIG. 1 illustrates an isometric exploded view of a projector in cooperation with an associated first embodiment of a first aspect image-projector accessory-attachment adapter and an associated image-projector accessory operatively coupled thereto.
Figure 2:
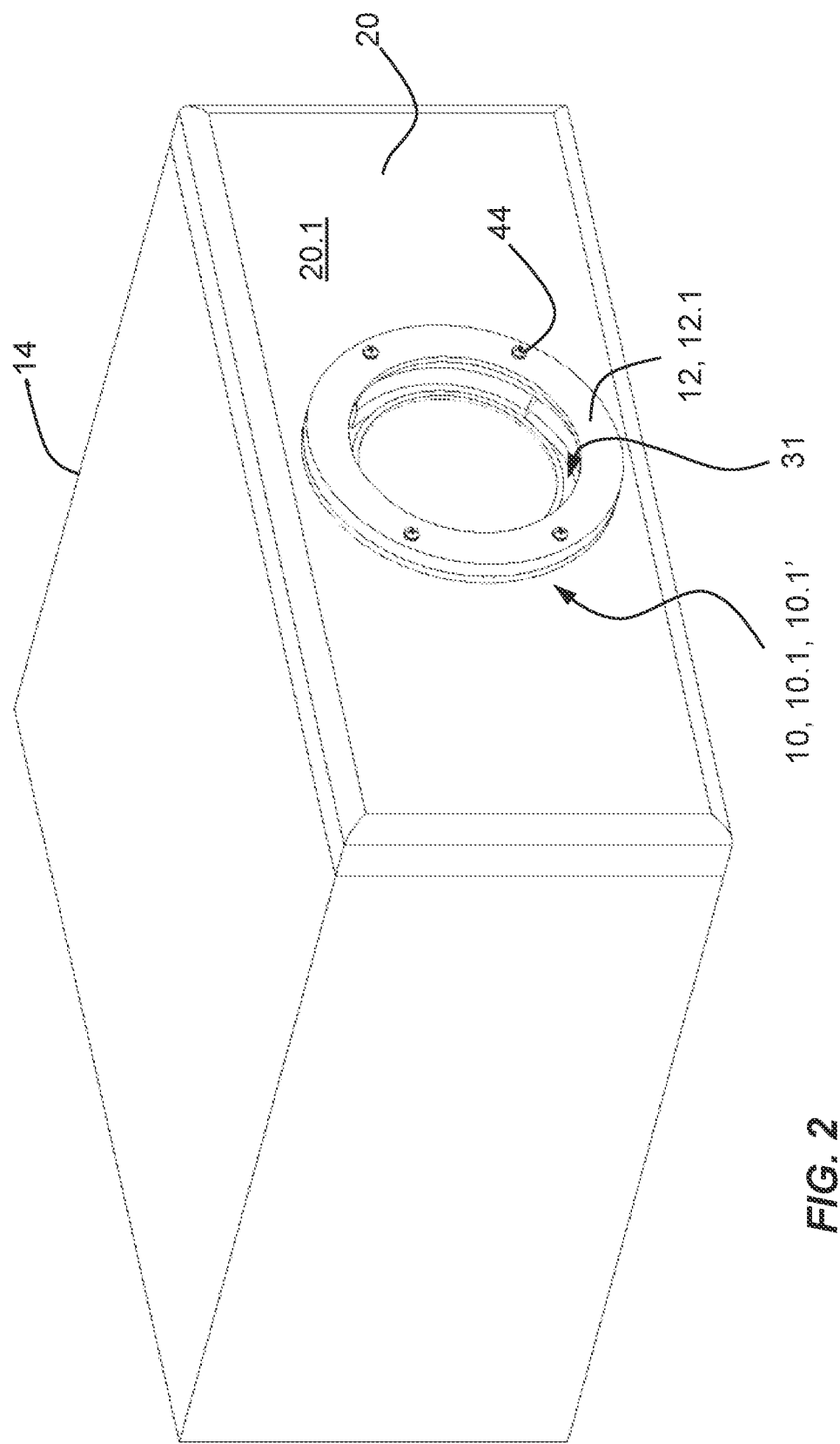
FIG. 2 illustrates an isometric view of a projector in cooperation with the associated first-embodiment first-aspect image-projector accessory-attachment adapter and an associated image-projector accessory operatively coupled thereto, as also illustrated in FIG. 1.
Figure 3:
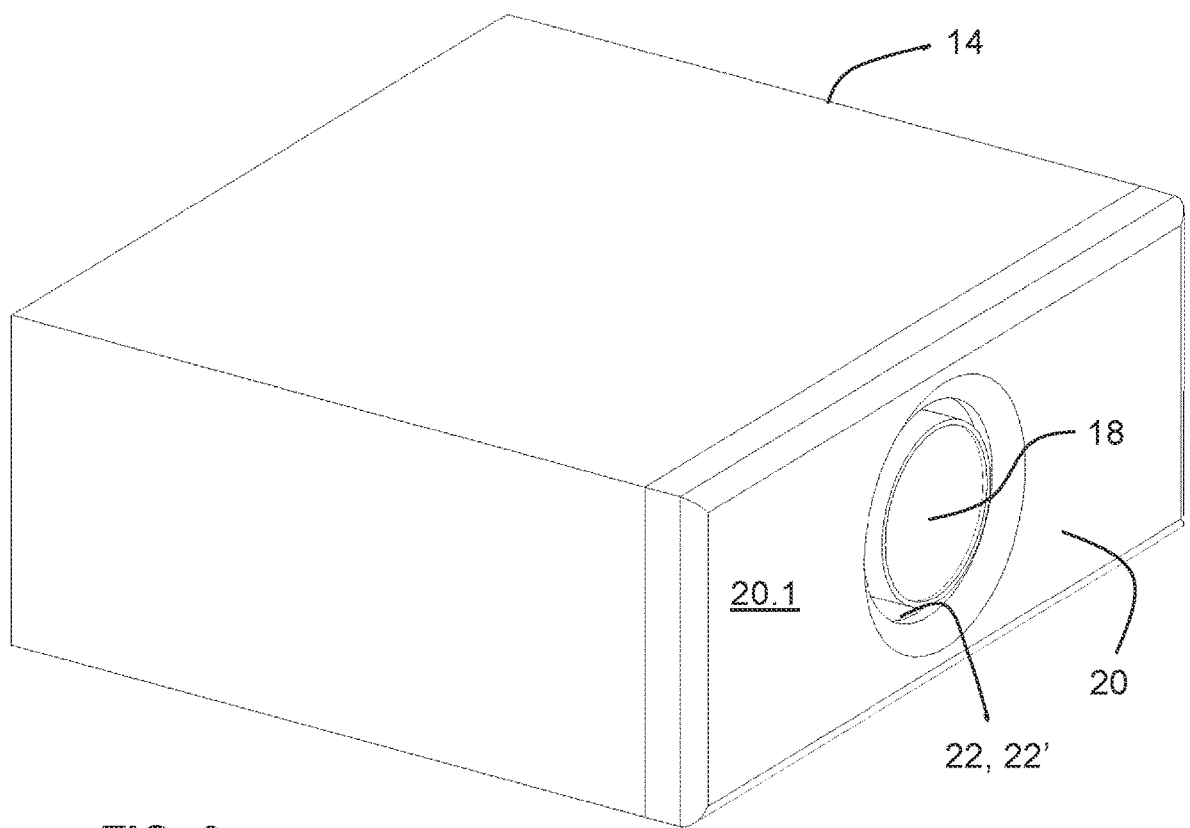
FIG. 3 illustrates an image projector to which an image-projector accessory is to be attached.
Figure 4:
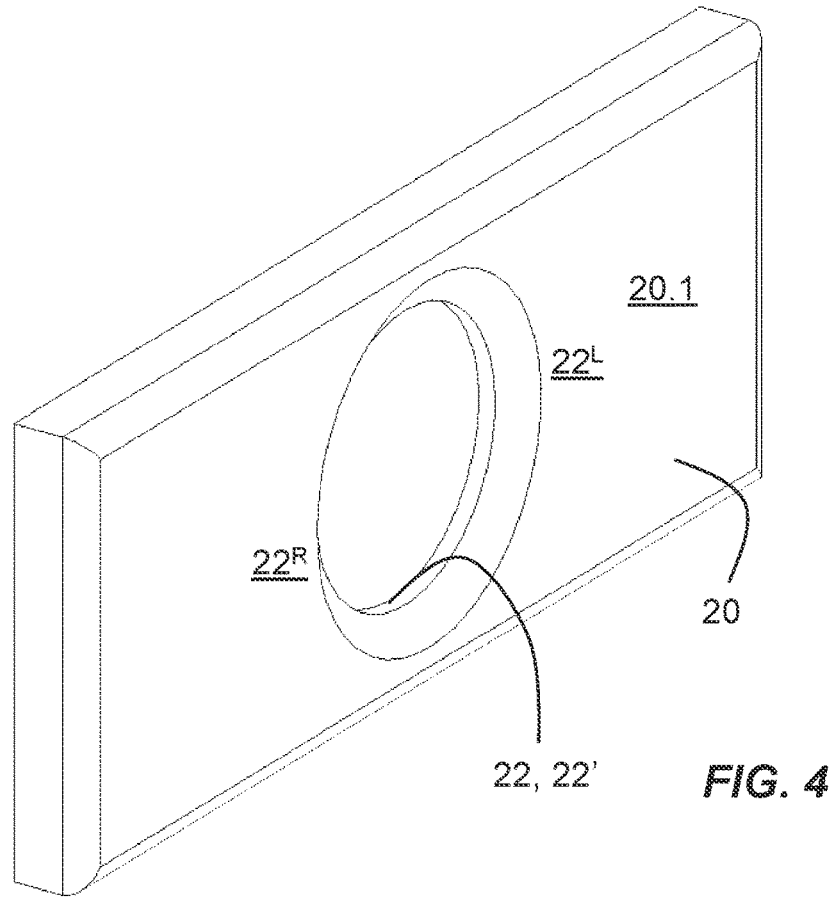
FIG. 4 illustrates an isometric front view of the front housing of the image projector illustrated in FIGS. 1-3, in isolation from the image projector.

Referring to FIGS. 1-4, an accessory-attachment adapter 10 provides for attaching an image-projector accessory 12 to an associated image projector 14.

Image projection systems can often benefit from cooperation with image-projector accessories 12—for example, optical filters 12.1 or additional lenses, such as an anamorphic optical system—positioned in front of the projector lens 18. However, many image projectors 14 are not manufactured with a convenient means of attaching such accessories, but otherwise incorporate a rigid front housing 20 with an opening 22 through which the projector lens 18 protrudes, with sufficient clearance around the projector lens 18 to provide for both vertical and horizontal transverse positional adjustment thereof to provide for transversely shifting the projected image. Furthermore, for these image projectors 14, the front housing 20 does not extend completely, or directly, back to the projector chassis, therefore providing at least some accessible surfaces or contact points 24, such as the rear (i.e. inside) surface of the front housing 20, or a rear-facing rim or edge 24.1 that is facing at least partially rearwards toward the projector chassis in general opposition to the front surface 20.1 of the front housing 20.

In accordance with a first aspect 10.1, an accessory-attachment adapter 10, 10.1 incorporates an accessory-interface structure 28 (i.e. a first structure 28) that is operatively coupled to at least one associated projector-attachment structure 30 (i.e. at least one second structure 30), wherein the accessory-interface structure 28 either provides for attaching to, or is integrated with, an associated image-projector accessory 12; and the at least one projector-attachment structure 30 exploits the clearance from the radial gap 31 between the projector lens 18 and the radially-inside edge 22' of the opening 22 in the front housing 20 through which the projector lens 18 protrudes, or may protrude, and exploits the accessibility of the rear-facing rim or edge 24.1 that is facing at least partially rearwards toward the projector chassis, to provide for securely attaching the accessory-attachment adapter 10, 10.1 to the image projector 14.

In accordance with a first aspect, the at least one projector-attachment structure 30 is configured so that when operatively coupled to the accessory-interface structure 28, a rear surface 28.1 of the accessory-interface structure 28 makes a first physical contact with a front surface 20.1 of the front housing 20 of the image projector 14 while surrounding, and providing an opening for, the projector lens 18; and the accessory-attachment adapter 10, 10.1 incorporates at least one projector-attachment structure 30 operatively coupled to the accessory-interface structure 28—for example, either integral therewith or assembled therewith—so as to make one or more second physical contacts with the front housing 20, wherein the first and one or more second physical contacts provide for immobilizing and securing the accessory-interface structure 28 against the front housing 20; and the accessory-interface structure 28 either incorporates features for attaching an image-projector accessory 12, 12.1 thereto, or further incorporates, or is incorporated in or on, the associated image-projector accessory 12, 12.1 integrated therewith. The first and one or more second contact with the front housing 20 of image projector 14 sufficiently oppose each other to effectively provide for clamping the accessory-interface structure 28 to the front housing 20 of the image projector 14 so as to provide a secure attachment to the image projector 14 sufficient to provide for positioning and retaining the image-projector accessory 12, 12.1 in front of the projector lens 18.

In accordance with a second aspect, the at least one projector-attachment structure 30 is configured so that when operatively coupled to the image projector 14 in cooperation with the accessory-attachment adapter 10, 10.1, the at least one projector-attachment structure 30 bears against the front housing 20 from both forward, rearward and radial components of direction relative to the opening 22 at an associated plurality of second physical contacts, so as to provide for immobilizing and securing the accessory-interface structure 28 with respect to the front housing 20 when the former is attached to the at least one projector-attachment structure 30, without the accessory-interface structure 28 necessarily being in first physical contact with the front surface 20.1 of the front housing 20 of the image projector 14.

Depending upon the nature of the front housing 20 of the image projector 14, a particular embodiment of the at least one projector-attachment structure 30 may incorporate and, at least in part operate in accordance with, both the first- and second aspects, supra, thereof.

Referring also to FIGS. 5-8, for either the first- or second-aspect at least one projector-attachment structure 30, the at least one projector-attachment structure 30 may comprise a plurality of projector-attachment structures 30, for example, with each projector-attachment structure 30 of the plurality comprising an arcuate segment of less than 180 degrees circumferential extent, wherein for the plurality of projector-attachment structures 30, either the entirely thereof are assembled to the accessory-interface structure 28 as illustrated in FIGS. 1, 5, 6 and 8, or, alternatively, less than all of the projector-attachment structures 30 are integral with the accessory-interface structure 28 provided that a sufficient quantity of the remaining accessory-interface structure 28 are assembled therewith so as to provide for installation and removal of the accessory-attachment adapter 10, 10.1 on and from the image projector 14.

For example, in one set of embodiments, each at least one projector-attachment structure 30 is arcuately shaped and extends over a circumferential span, and incorporates an external groove 32 that provides for mating with the edge surfaces of the opening 22 in the front housing 20 of the image projector 14. More generally, a first arcuate portion 30.1 of the at least one projector-attachment structure 30 provides for axially extending through the opening through the front housing 20 of the image projector 14. The at least one projector-attachment structure 30 incorporates, on a rear side thereof, at least one first arcuate segment 30.2 having a diameter greater than a diameter of the opening 22 in the front housing 20, wherein the at least one first arcuate segment 30.2 provides for abutting a rear surface of the front housing 20 of the image projector 14. The at least one projector-attachment structure 30 further incorporates, on a front side thereof, at least one second arcuate segment 30.3 having a diameter greater than the diameter of the opening 22 in the front housing 20, wherein the at least one second arcuate segment 30.3 provides for abutting a front surface 20.1 of the front housing 20 of the image projector 14. In accordance with use under the first aspect of the at least one projector-attachment structure 30, a front-facing side of the at least one first arcuate segment 30.2 on the rear side of the at least one projector-attachment structure 30 becomes clamped against a corresponding rear-facing portion of the front housing 20 proximate to the opening 22 therethrough. In accordance with use under the second aspect of the at least one projector-attachment structure 30, the rear-facing side of the at least one second arcuate segment 30.2 on the front side of the at least one projector-attachment structure 30 also becomes clamped against a corresponding front-facing portion of the front housing 20 proximate to the opening 22 therethrough, for example, clamped against a conical, front-facing surface 20.3 of the front housing 20 between the opening 22 and a planar portion of the front surface 20.1 of the front housing 20.

In accordance with one set of embodiments, the accessory-attachment adapter 10, 10.1 is installable on and removable from the image projector 14 without more than insubstantial effect thereto, while also minimizing any restrictions on the transverse shifting of the projector lens 18 for which the opening 22 in the front housing 20 may have been originally configured, so as to have at most inconsequential impact on the utility and functionality of the image projector 14.

Figure 9:
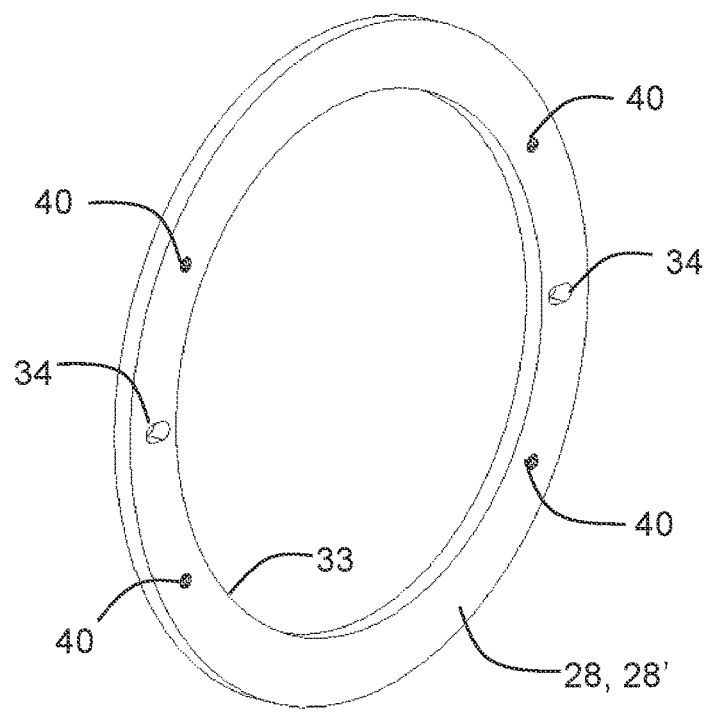
FIG. 9 illustrates an isometric view of an accessory-interface structure of the first-embodiment first-aspect image-projector accessory-attachment adapter illustrated in FIGS. 1 and 2.

In accordance with a first embodiment 10.1', the first-aspect accessory-attachment adapter 10, 10.1, 10.1' incorporates a pair of projector-attachment structures 30, 30', and the accessory-interface structure 28 comprises a closed ring 28' that, when used in accordance with a first aspect of the pair of projector-attachment structures 30, 30', is configured to mate with the front surface 20.1 of the front housing 20 of the image projector 14 proximate the opening 22 in the front housing 20 through which the projector lens 18—or at least the resulting projection beam of light that passes therethrough during operation of the image projector 14—extends, wherein the accessory-interface structure 28 incorporates a corresponding opening 33 that is sized to minimize interference with the projector lens 18 and the associated projection beam of light during typical operational use of the image projector 14. Referring to FIG. 9, in accordance with one set of embodiments, the accessory-interface structure 28 further incorporates a pair of slotted holes 34 that provide for the insertion of associated attachment screws 36 therethrough into corresponding threaded holes 38 in the pair of projector-attachment structures 30, 30' at locations abutting the horizontal left $22^L$ and right $22^R$ sides of the opening 22, wherein the pair of projector-attachment structures 30, 30' extend rearward and laterally outward relative to the accessory-interface structure 28 and the opening 33 therethrough, so as to provide for making contact with a substantially-rear-facing surface 20.2 of the front housing 20. The slotted holes 34 are sufficiently elongated so that when the attachment screws 36 are loosened, the projector-attachment structures 30, 30' can be shifted laterally toward the center of the opening 22 of the front housing 20 so as to provide for freely inserting or extracting the projector-attachment structures 30, 30' into or from the opening 22, so as to provide for installing or removing the accessory-attachment adapter 10, 10.1, 10.1' onto or from the image projector 14. The accessory-interface structure 28 further incorporates attachment features, for example, associated clearance holes 40 that cooperate with corresponding threaded holes 42 in the at least one projector-attachment structure 30, 30', that together provide for the attachment of an associated image-projector accessory 12, 12.1 thereto; or alternatively, the accessory-interface structure 28 may be integrated with the associated image-projector accessory 12, 12.1.

Figure 10:
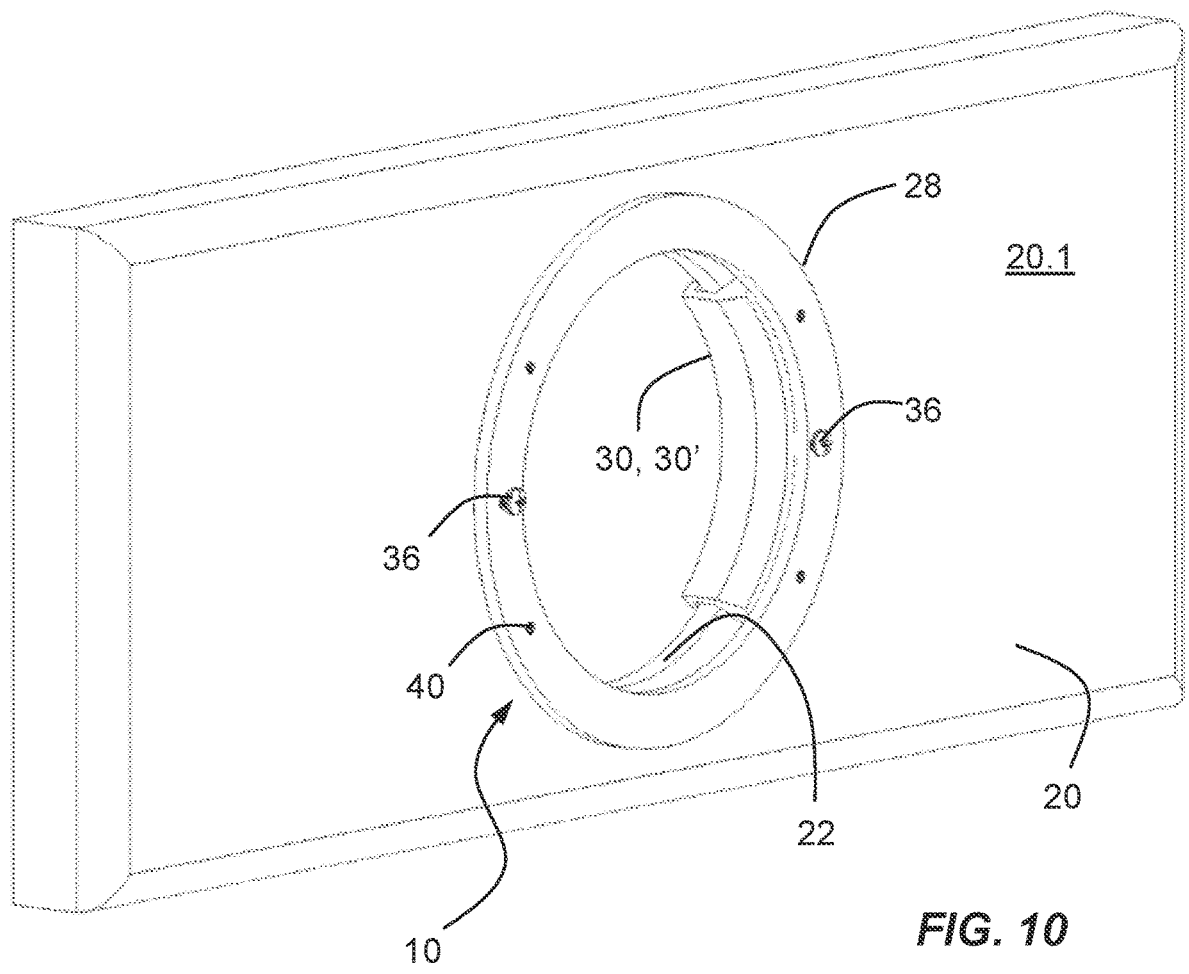
FIG. 10 illustrates an isometric front view of the front housing of the image projector illustrated in FIGS. 1-3, in isolation from the image projector, in cooperation with the first-embodiment first-aspect image-projector accessory-attachment adapter illustrated in FIGS. 1 and 2, with the associated pair of projector-attachment structures positioned for insertion in, or removal from, the opening in the front housing.
Figure 11:
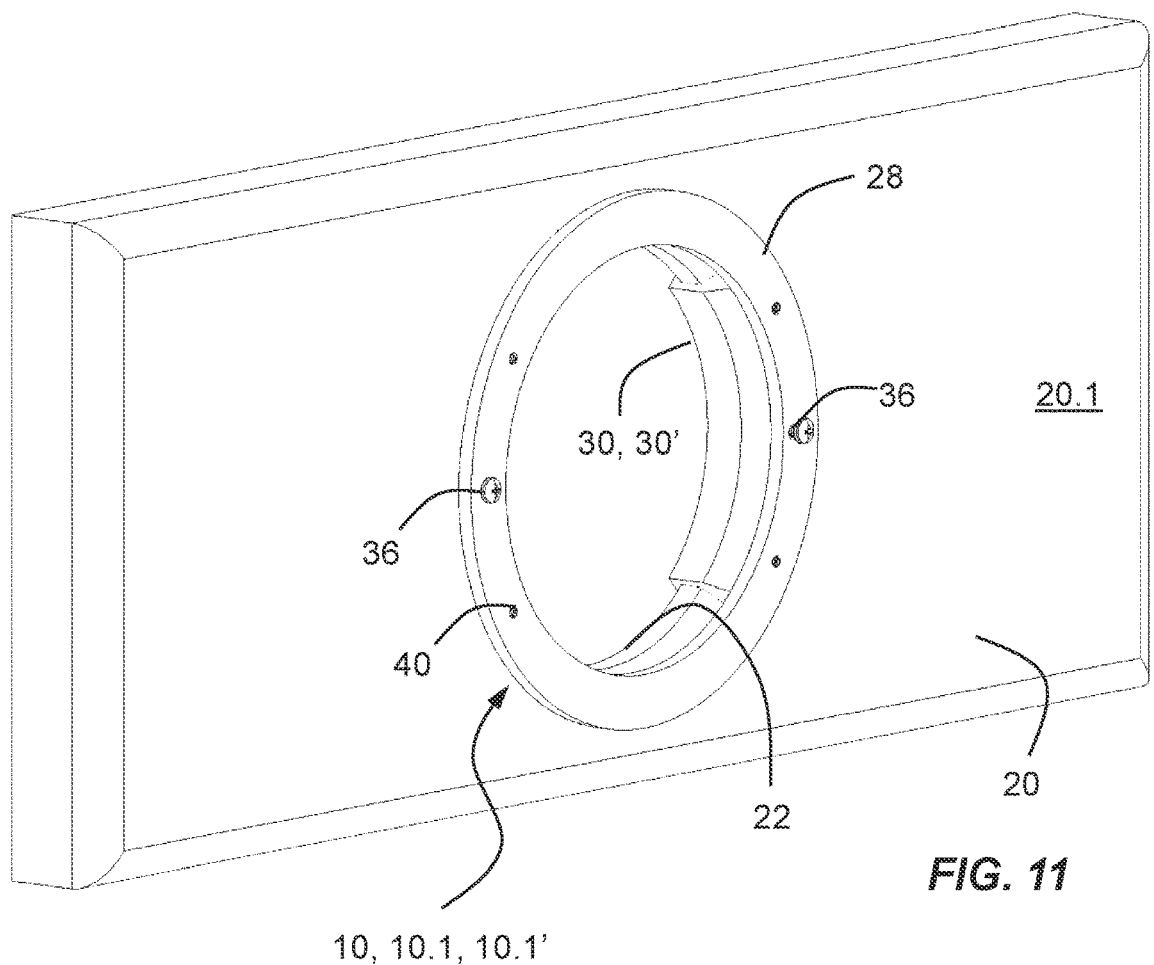
FIG. 11 illustrates an isometric front view of the front housing of the image projector illustrated in FIGS. 1-3, in isolation from the image projector, in cooperation with the first-embodiment first-aspect image-projector accessory-attachment adapter illustrated in FIGS. 1 and 2, with the associated pair of projector-attachment structures clamped against the opening in the front housing so as to provide for securing the first-embodiment first-aspect image-projector accessory-attachment adapter thereto.
Figure 12:
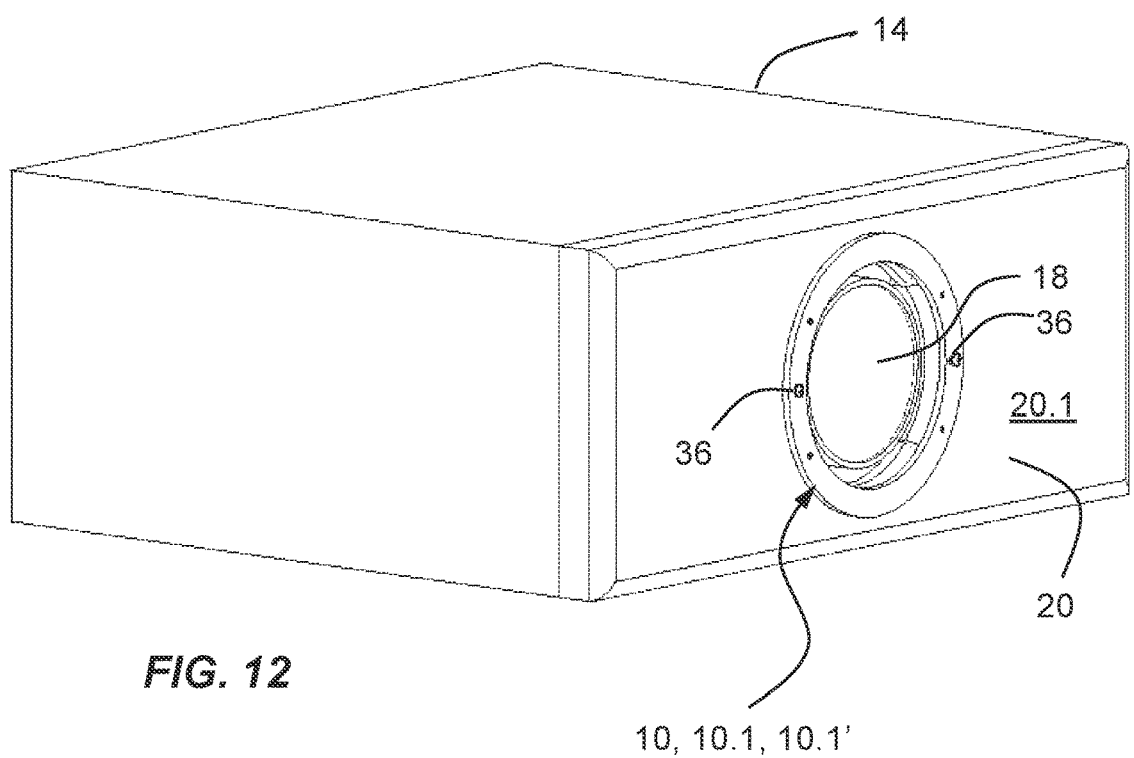
FIG. 12 illustrates an isometric view of the image projector illustrated in FIG. 3 to which the first-embodiment first-aspect image-projector accessory-attachment adapter illustrated in FIGS. 1 and 2 has been attached, prior to an operative coupling of an associated image-projector accessory thereto
Figure 13:
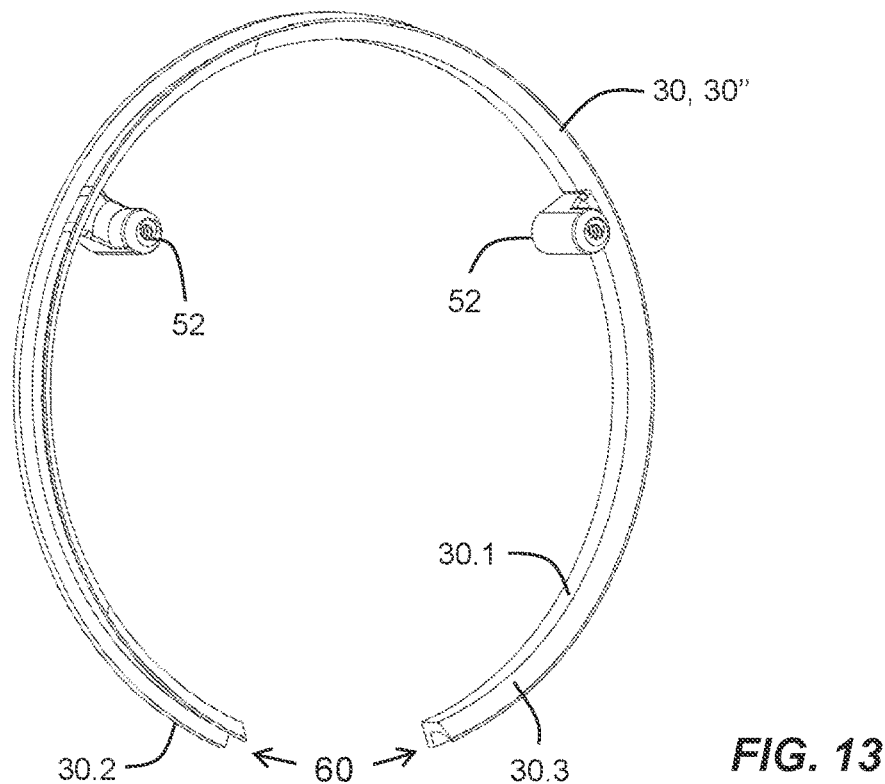
FIG. 13 illustrates a projector-attachment structure of a second embodiment of the first-aspect image-projector accessory-attachment adapter.
Figure 14:
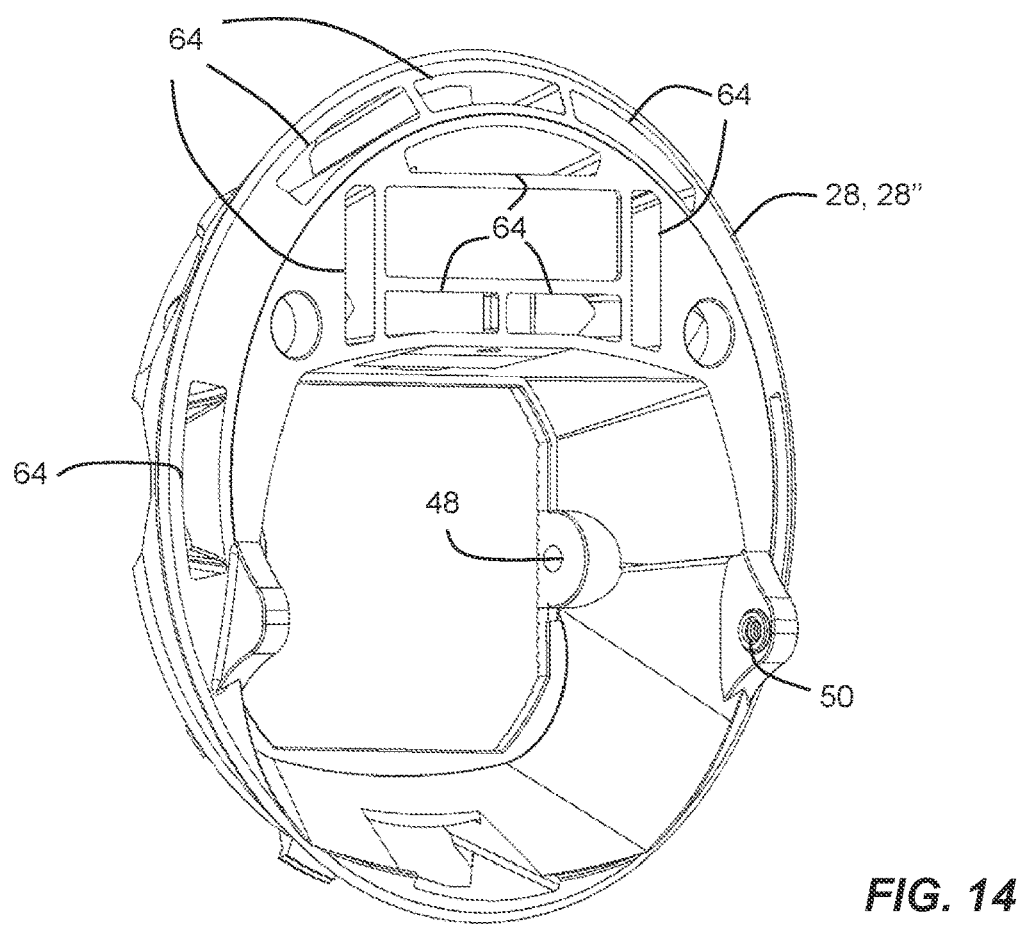
FIG. 14 illustrates an accessory-interface structure of the second-embodiment first-aspect image-projector accessory-attachment adapter, which cooperates with the projector-attachment structure illustrated in FIG. 13.
Figure 15:
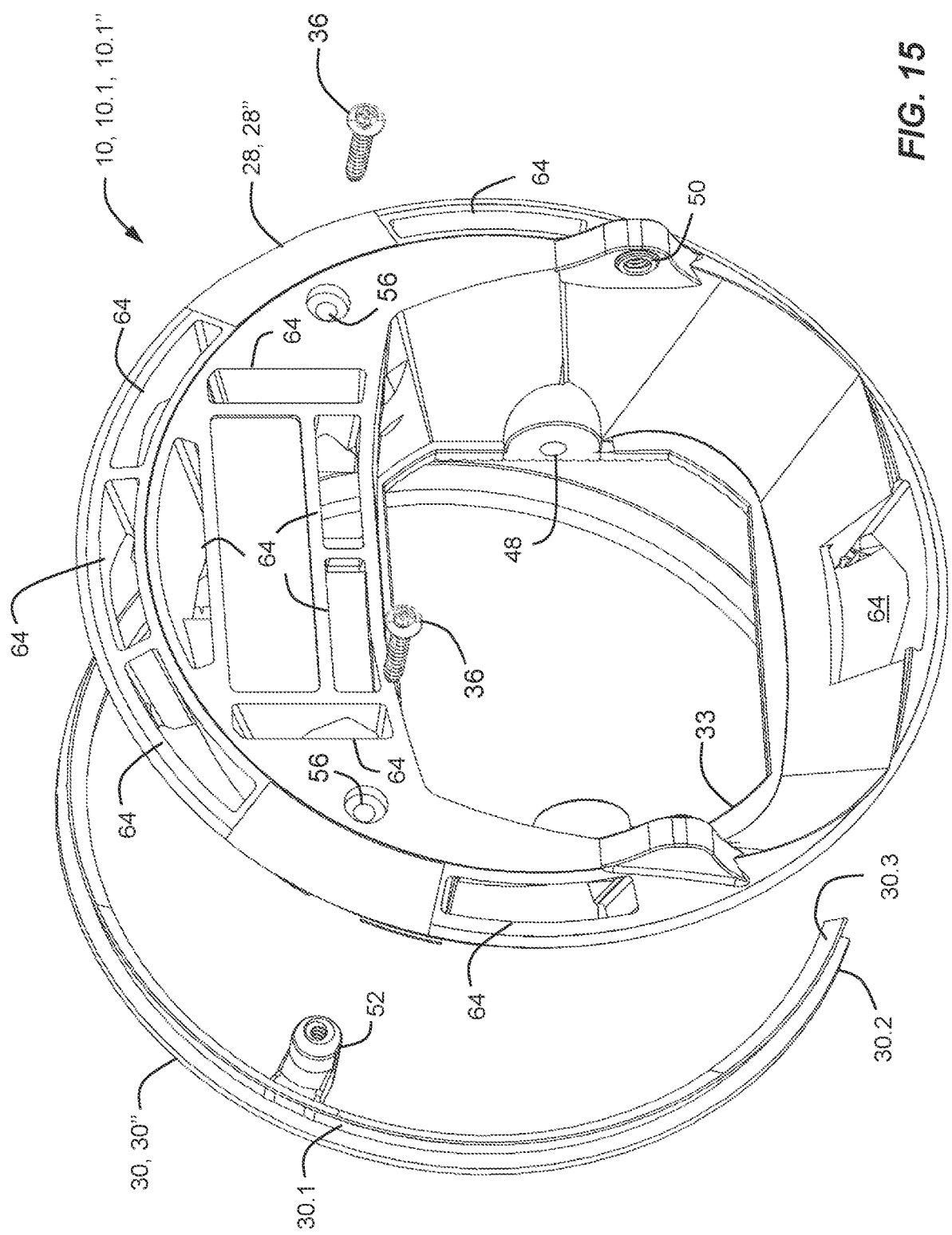
FIG. 15 illustrates an isometric exploded view from an oblique front perspective of the second-embodiment first-aspect image-projector accessory-attachment adapter, for which the associated projector-attachment and accessory-interface structures are illustrated in isolation in FIGS. 13 and 14 respectively.
Figure 16:
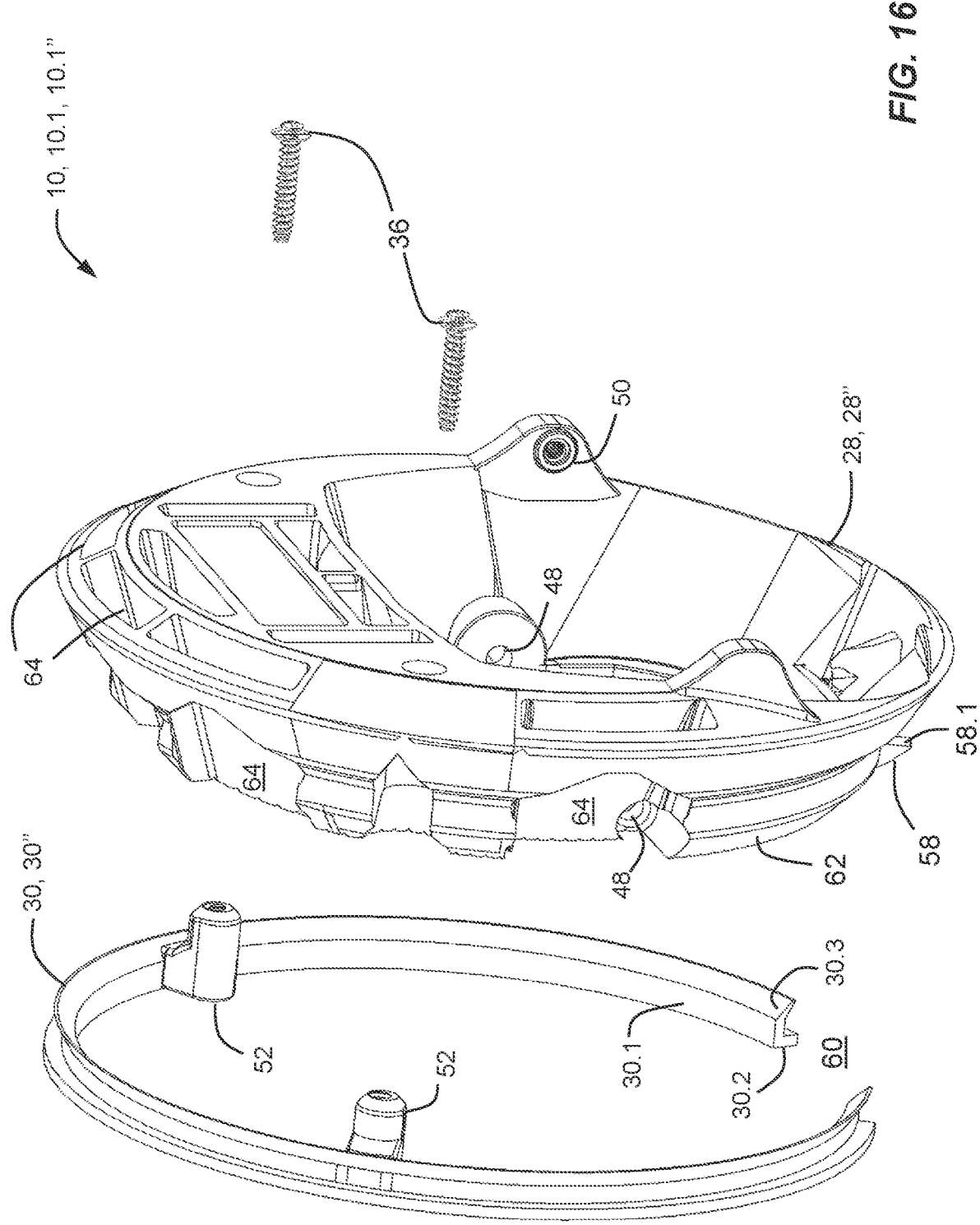
FIG. 16 illustrates an isometric exploded view from an oblique front side perspective of the second-embodiment first-aspect image-projector accessory-attachment adapter illustrated in FIG. 15.
Figure 17:
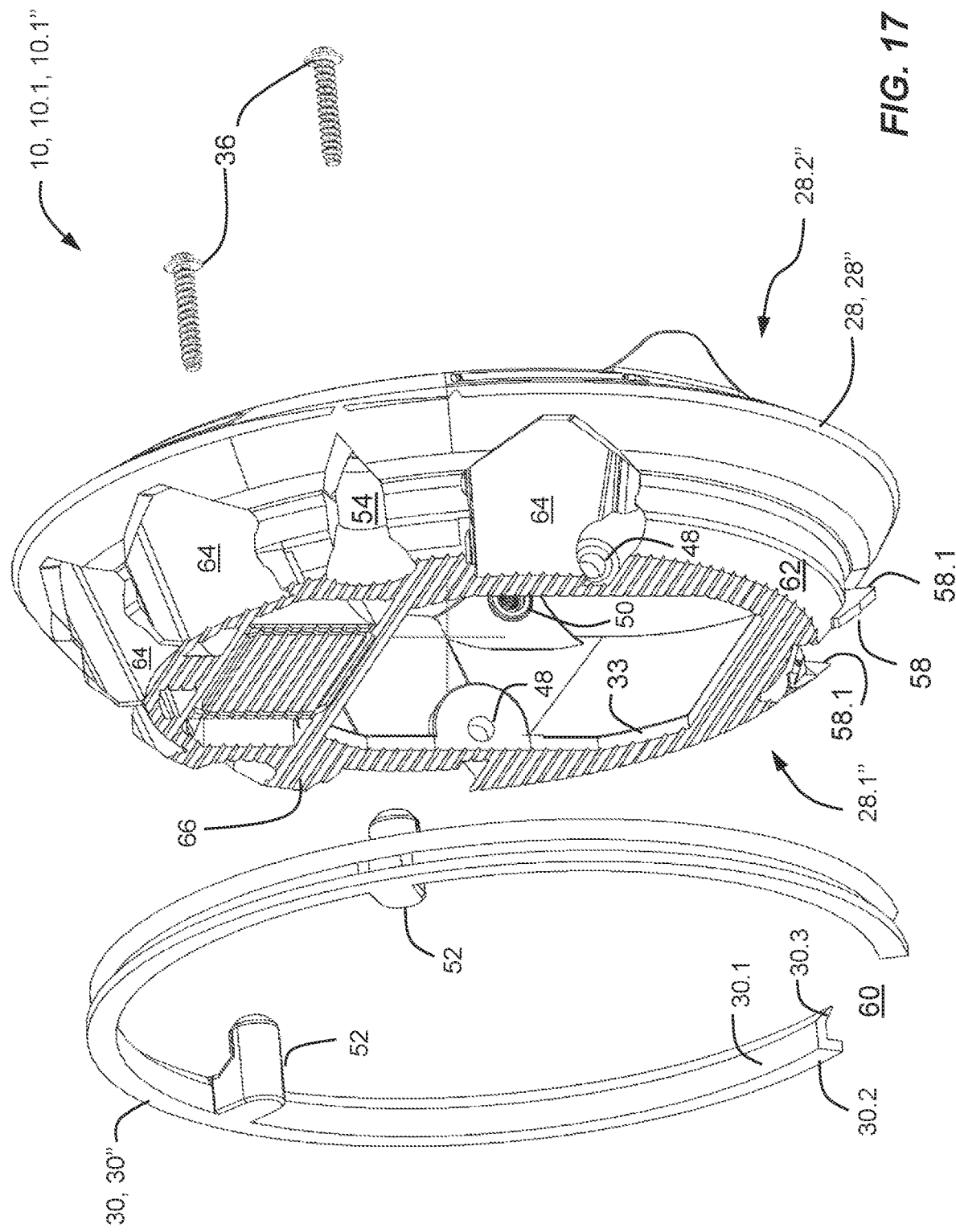
FIG. 17 illustrates an isometric exploded view from an oblique rear side perspective of the second-embodiment first-aspect image-projector accessory-attachment adapter illustrated in FIGS. 15 and 16.
Figure 18:
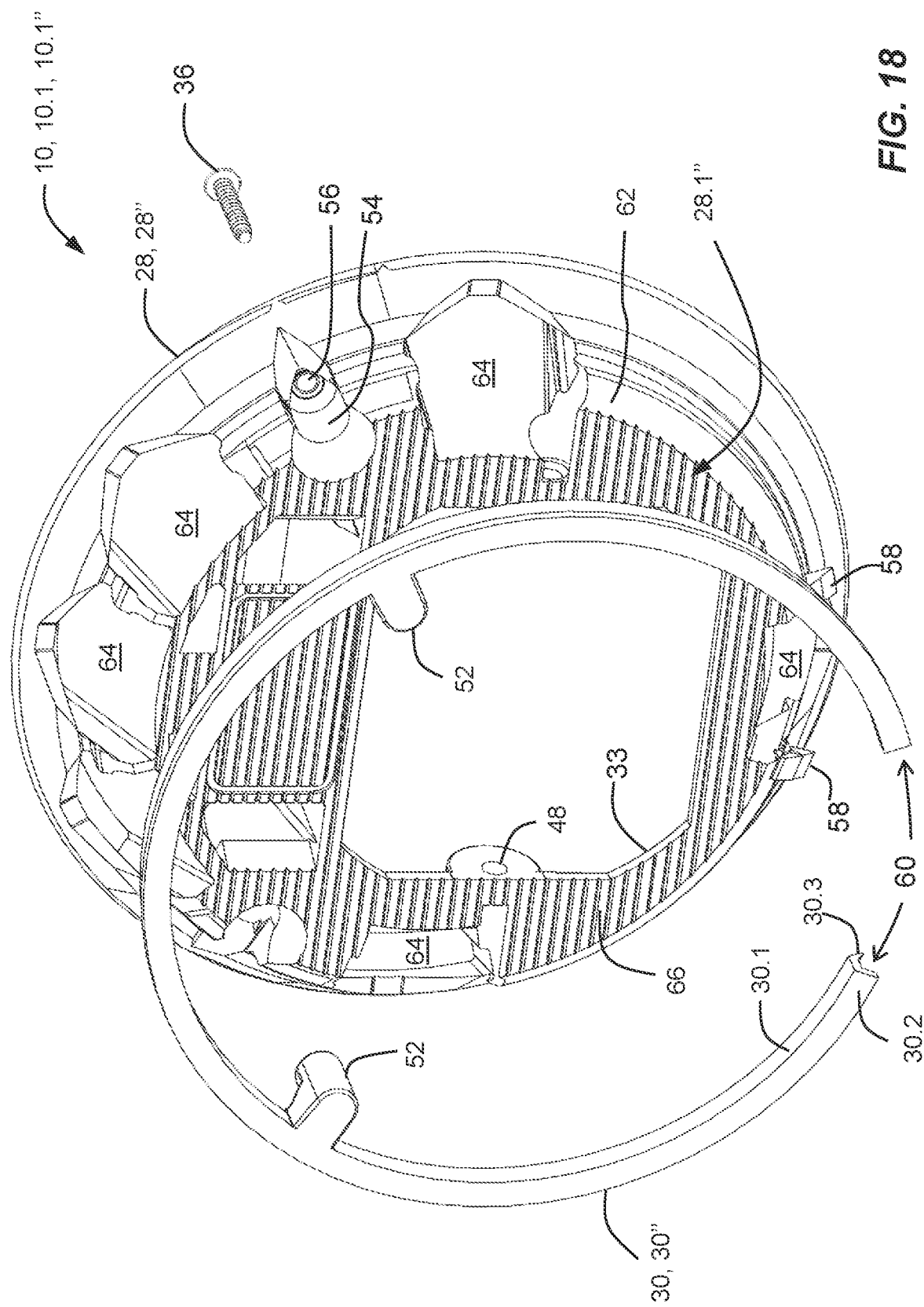
FIG. 18 illustrates an isometric exploded view from an oblique rear perspective of the second-embodiment first-aspect image-projector accessory-attachment adapter illustrated in FIGS. 15-17.
Figure 19:
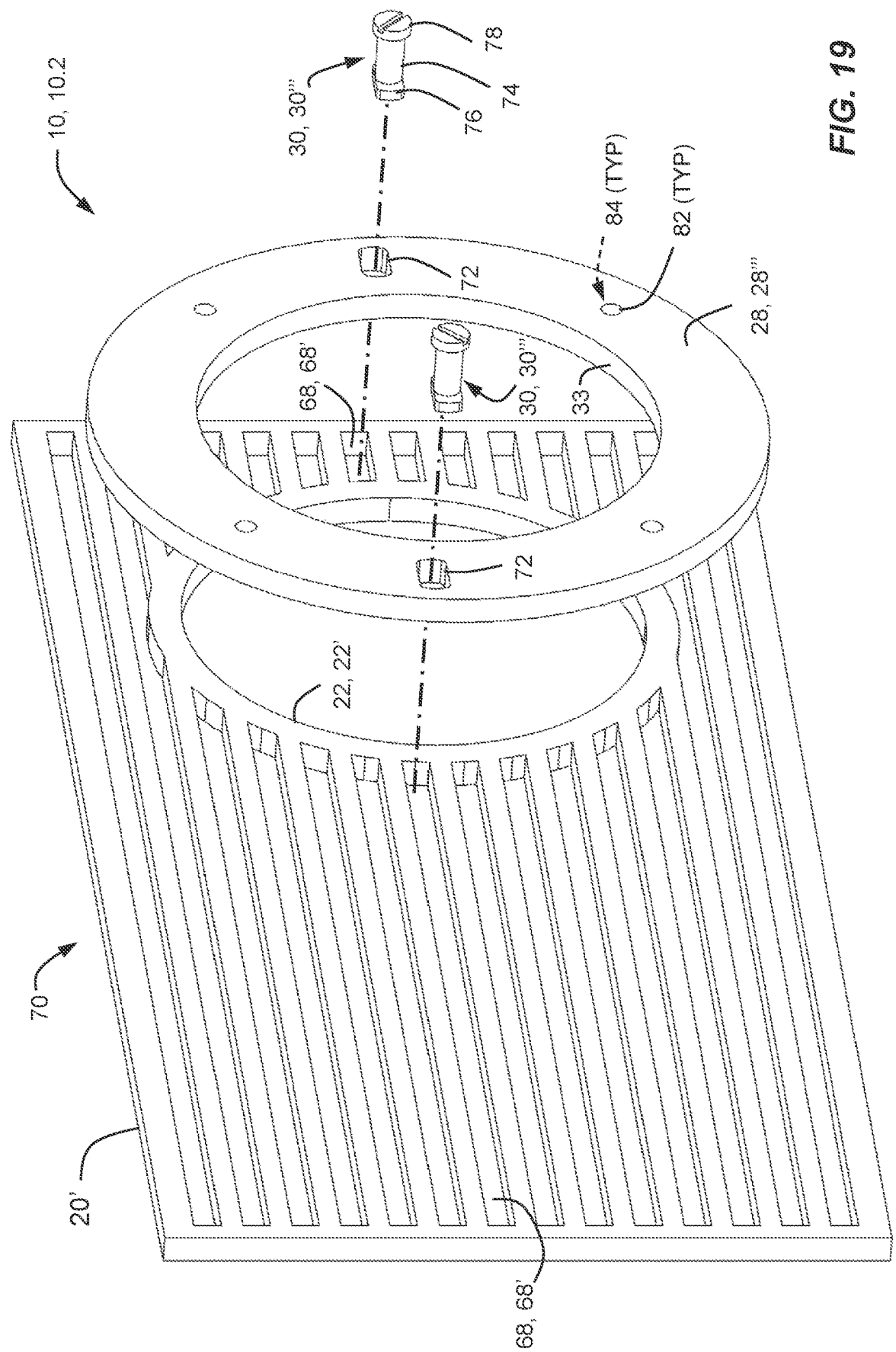
FIG. 19 illustrates an isometric exploded view from an oblique front perspective of a second aspect of an image-projector accessory-attachment adapter, in cooperation with an associated front housing of an image projector.
Figure 20:
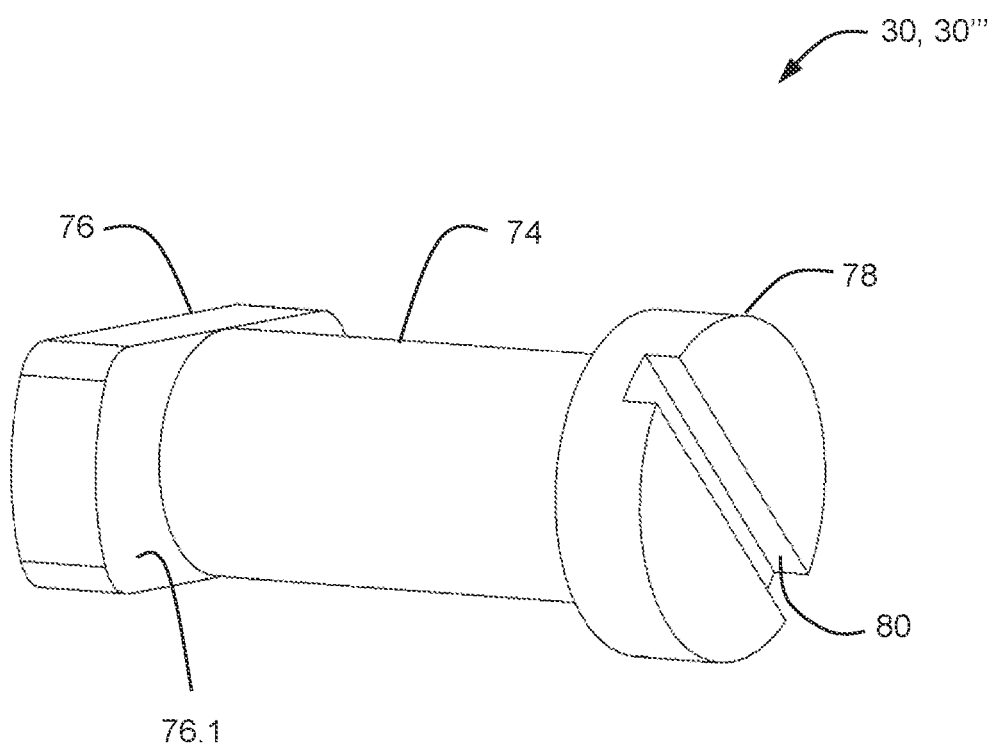
FIG. 20 illustrates a projector-attachment structure of the second-aspect image-projector accessory-attachment adapter illustrated in FIG. 19.

Referring to FIG. 10, in accordance with one set of embodiments, the accessory-attachment adapter 10, 10.1, 10.1' is attached to the front housing 20 of the image projector 14 by first loosely attaching the accessory-interface structure 28 to the at least one projector-attachment structure 30, 30' with the associated attachment screw(s) 36 through the slotted hole(s) 34 in the accessory-interface structure 28 and into the threaded hole(s) 38 in the at least one projector-attachment structure 30, 30', with the projector-attachment structures 30, 30' positioned relative to the accessory-interface structure 28 so as to be freely insertable into the opening 22 in the front housing 20. In accordance with the first aspect, the projector-attachment structures 30, 30' are then inserted into the opening 22 until the rear surface 28.1 of the accessory-interface structure 28 is in contact with the front surface 20.1 of the front housing 20. Then, referring to FIG. 11, the at least one projector-attachment structure(s) 30, 30' is/are repositioned relative to the accessory-interface structure 28 by sliding the associated attachment screws 36 in the associated slotted holes 34 radially/latterly outwards relative to the opening 22 in the front housing 20 until the at least one projector-attachment structure(s) 30, 30' makes aforementioned contact with the corresponding surfaces of the front housing 20, after which the attachment screws 36 are tightened so as to firmly clamp the accessory-attachment adapter 10, 10.1, 10.1' to the front housing 20 as illustrated in FIG. 12, after which, referring again to FIGS. 1 and 2, the associated image-projector accessory 12, 12.1 may be attached to the accessory-interface structure 28 if not already integrated therewith.

Figure 5:
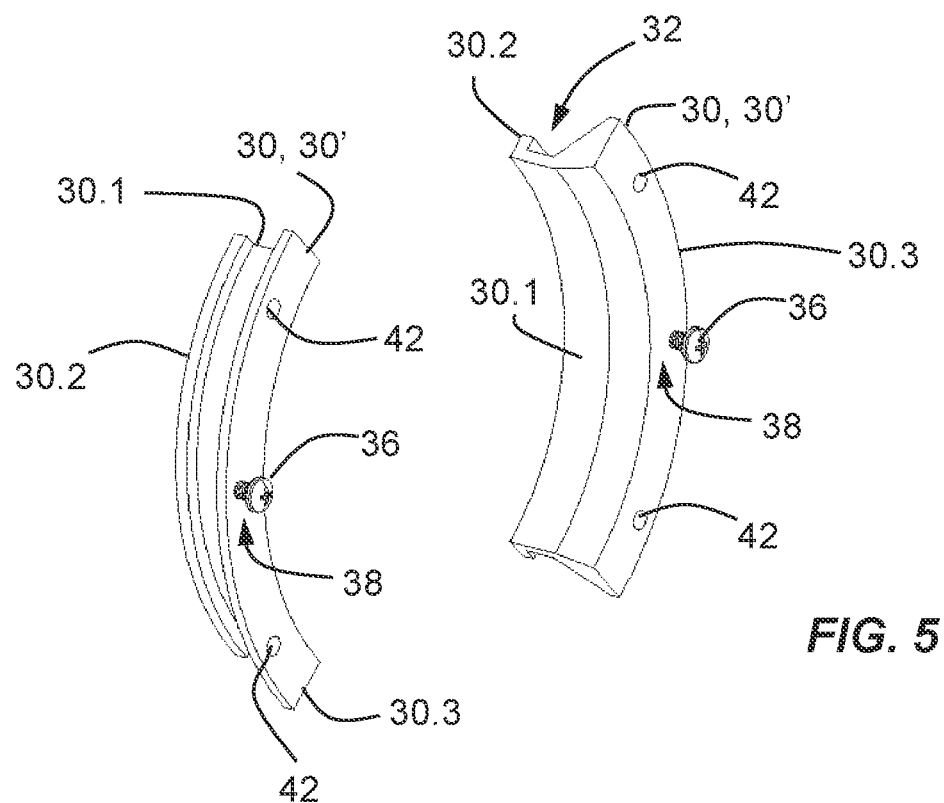
FIG. 5 illustrates an isometric front view of a pair of projector-attachment structures of the first-embodiment first-aspect image-projector accessory-attachment adapter illustrated in FIG. 1.
Figure 6:
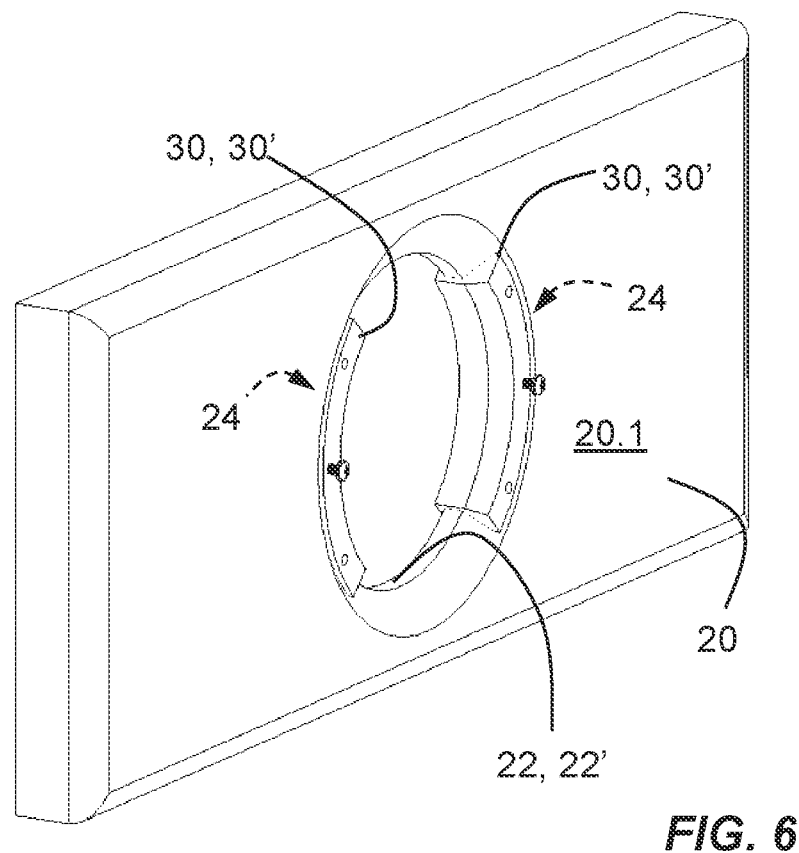
FIG. 6 illustrates an isometric front view of the front housing of the image projector illustrated in FIGS. 1-3, in isolation from the image projector, in cooperation with the pair of projector-attachment structures illustrated in FIG. 5.
Figure 7:
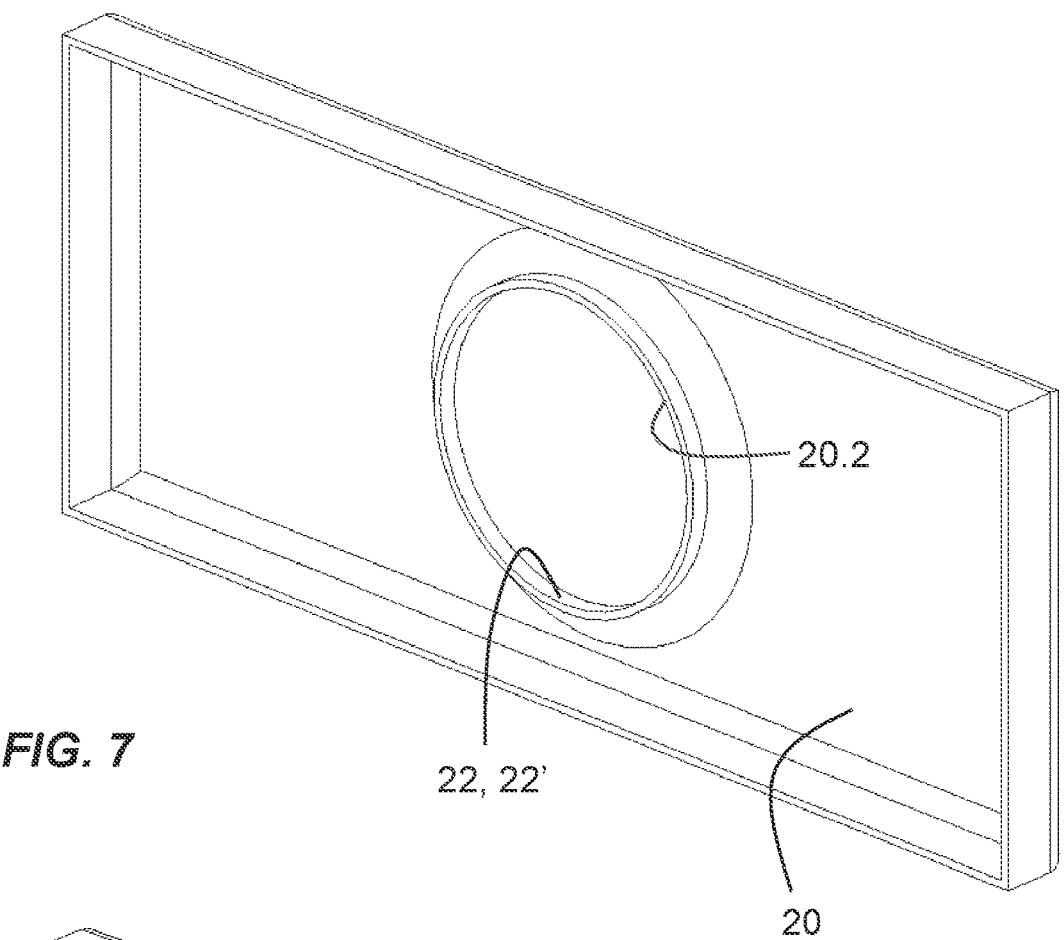
FIG. 7 illustrates an isometric rear view of the front housing of the image projector illustrated in FIGS. 1-3, in isolation from the image projector.
Figure 8:
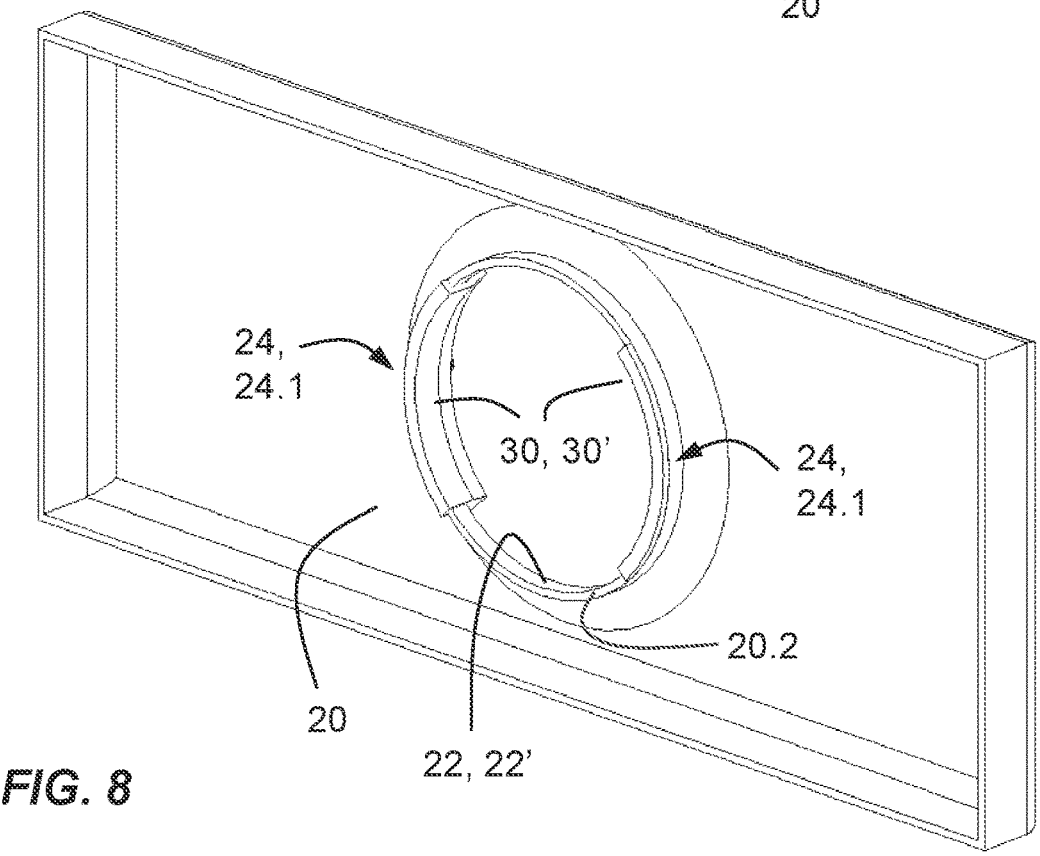
FIG. 8 illustrates an isometric rear view of the front housing of the image projector illustrated in FIGS. 1-3, in isolation from the image projector, in cooperation with the pair of projector-attachment structures illustrated in FIG. 5.

Finally, referring to FIGS. 1, 5 and 6, the image-projector accessory 12, 12.1 is attached to the at least one projector-attachment structure 30, 30' with a plurality of accessory-attachment screws 44 through the corresponding holes 46 in the image-projector accessory 12, 12.1, through the clearance holes 40 in the accessory-interface structure 28, and into the threaded holes 42 in the associated at least one projector-attachment structure 30, 30', which provides for further securing the accessory-interface structure 28 both to the at least one projector-attachment structure 30, 30' and to the front housing 20 of the image projector 14 by retaining the at least one projector-attachment structure 30, 30' in abutment with the edges of the opening 22 in the front housing 20, and preventing the at least one projector-attachment structure 30, 30' from coming loose from the front housing 20 by sliding radially inwards relative to the opening 22 as a result of vibration or other influences.

Accordingly, the accessory-attachment adapter 10, 10.1, 10.1' provides a convenient means of attaching and removing an image-projector accessory 12, 12.1 to and from the front housing 20 of an image projector 14, in front of an associated projector lens 18, without damage or more than insubstantial effect to the image projector 14. Furthermore, the associated at least one projector-attachment structure 30, 30' is sufficiently thin in a radial direction relative to the radial gap 31 in the opening 22 in the front housing 20 so as to not overly limit either the longitudinal or the transverse range of motion of the projector lens 18 relative to the opening 22 in the front housing 20 that otherwise provides for adjusting/positioning the projected image during operation of the image projector 14. For example, typically the vertical imaging shifting capability of the image projector 14, and therefore the associated transverse travel of the associated projector lens 18, in the vertical direction, is far more important to the operation of the image projector 14 than is such a capability and associated transverse travel in the horizontal direction, which is provided for by orienting the accessory-interface structure 28 to provide for horizontal positioning of the at least one projector-attachment structure 30, 30' left and right of the projector lens 18, which therefore minimizes the associated constraint on transverse travel of the projector lens 18 in the vertical direction relative to the opening 22 in the front housing 20.

Accordingly, the above-described accessory-attachment adapter 10, 10.1, 10.1' is suitable if there is sufficient space between the projector lens 18 and the opening 22 for the projector-attachment structures 30, 30' to be directly inserted into the opening 22 while loosely attached to the accessory-interface structure 28 and arranged for insertion therethrough. This sufficiency of space is typical of projectors that provide for the ability to transversely shift the projector lens 18 in support of an ability to transversely shift the projected image. However, for some image projectors, the associated projector lens 18 may protrude out of the opening 22 and thereafter flare to a size which prevents such a direct insertion, in which case, the projector lens 18 could be temporarily transversely positioned in a first lateral direction relative to the opening 22 in the front housing 20 to sufficiently expand the associated radial gap 31 so as to provide for insertion of one or both of the at least one projector-attachment structures 30, 30', and then, if not already inserted, temporarily transversely positioned in an opposing second lateral direction relative to the opening 22 in the front housing 20 to sufficiently expand the associated radial gap 31 so as to provide for insertion of the other of the at least one projector-attachment structures 30, 30'. Alternatively, the accessory-attachment adapter 10, 10.1, 10.1' could be attached to the front housing 20 after either temporarily removing, and then subsequently replacing, either the front housing 20 or the projector lens 18 of the image projector 14.

In accordance with another set of embodiments, the accessory-attachment adapter 10, 10.1, 10.1' in combination with the image-projector accessory 12, 12.1 can be further configured to fully enclose the projector lens 18 and opening 22, and thereby reduce the accumulation of dust and other contaminants that might otherwise infiltrate to the projector lens 18 through gaps between the image-projector accessory 12, 12.1 and the image projector 14. For example, an image-projector accessory 12, 12.1 comprising an optical filters 12.1 installed in front of the projector lens 18 can be provided in its own housing which fully extends back to the accessory-interface structure 28 of the accessory-attachment adapter 10, 10.1, 10.1' and which is attached thereto. As long as there are substantially no gaps between the front housing 20 and accessory-attachment adapter 10, 10.1, 10.1', nor between the accessory-attachment adapter 10, 10.1, 10.1' and the image-projector accessory 12, 12.1, there will be substantially no access for air to circulate from outside to inside that assembly to produce such contamination.

Notwithstanding the illustration of a pair of projector-attachment structures 30, 30' in the embodiment of FIGS. 1-12, in accordance with yet another set of embodiments, one of the pair of illustrated projector-attachment structures 30, 30' could alternatively be integrated with the accessory-interface structure 28, with the remaining projector-attachment structure 30, 30' attached to the accessory-interface structure 28 as described hereinabove.

Furthermore, in accordance with yet another set of embodiments, the projector-attachment structures 30, 30' could be biased radially-outwards relative to the opening 22 in the front housing 20 by an associated spring or cam mechanism, either in conjunction with or instead of the associated attachment screws 36, so as to preclude the need for either tightening, or even using, the attachment screws 36 to secure the accessory-attachment adapter 10, 10.1, 10.1' to the front housing 20 of the image projector 14.

Referring to FIGS. 13-18, in accordance with a second embodiment 10.1", the first-aspect accessory-attachment adapter 10, 10.1, 10.1" incorporates an associated second embodiment 30", single, split-ring projector-attachment structure 30, 30", and an associated second embodiment accessory-interface structure 28, 28" in cooperation therewith that provides for pivotally supporting a lens assembly (not illustrated) from a pair of accessory pivots 48 that depend therefrom, and that further incorporates a threaded receptacle 50 that will accommodated a screw, for example, so as to provide for frictionally-locking the pivotal position of the lens assembly by bearing thereagainst. For example, in one set of embodiments the accessory pivots 48, and the threaded receptacle 50 in cooperation with a tilt-lock screw (not illustrated) provide for setting and locking a tilt of the lens assembly about a horizontal axis so as to provide for adjusting the vertical position of an image projected by the image projector 14.

In one set of embodiments, the split-ring projector-attachment structure 30, 30" is sufficiently elastic so as to provide for initial insertion in the opening 22 in the front housing 20 of the image projector 14, and preliminary retention therewithin, for example, by first squeezing the outside of the split-ring projector-attachment structure 30, 30" so as to fit within the opening 22, and then releasing the squeeze thereof so as to enable the split-ring projector-attachment structure 30, 30" to spring back, and for the external groove 32 thereof to engage the opening 22 in the front housing 20 of the image projector 14, thereby preliminarily retaining the split-ring projector-attachment structure 30, 30" therewithin.

A first arcuate portion 30.1 of the split-ring projector-attachment structure 30, 30" provides for axially extending through the opening through the front housing 20 of the image projector 14. The split-ring projector-attachment structure 30, 30" incorporates, on a rear side thereof, at least one first arcuate segment 30.2 having a diameter greater than a diameter of the opening 22 in the front housing 20, wherein the at least one first arcuate segment 30.2 provides for abutting a rear surface of the front housing 20 of the image projector 14. The split-ring projector-attachment structure 30, 30" further incorporates, on a front side thereof, at least one second arcuate segment 30.3 having a diameter greater than a diameter of the opening 22 in the front housing 20, wherein the at least one second arcuate segment 30.3 provides for abutting a front surface 20.1 of the front housing 20 of the image projector 14. In accordance with use under the first aspect of the split-ring projector-attachment structure 30, 30", a front-facing side of the at least one first arcuate segment 30.2 on the rear side of the split-ring projector-attachment structure 30, 30" becomes clamped against a corresponding rear-facing portion of the front housing 20 proximate to the opening 22 therethrough.

Notwithstanding that FIGS. 13 and 15-18 illustrate the split-ring projector-attachment structure 30, 30" incorporating a single first arcuate segment 30.2 and single second arcuate segment 30.3, each spanning the circumferential extent of the first arcuate portion 30.1, it should be understood that either or both of the at least one first arcuate segment 30.2 and the at least one second arcuate segment 30.3 could comprise a plurality of arcuate segments 30.2, 30.3 that are interconnected by the first arcuate portion 30.1, provided that the number, spatial distribution, and circumferential extents of the plurality of first arcuate segments 30.2 and the plurality of second arcuate segments 30.3, is sufficient to resist relative motion of the accessory-interface structure 28, 28" relative to the split-ring projector-attachment structure 30, 30", and relative to the image projector 14, when the second-embodiment first-aspect accessory-attachment adapter 10, 10.1, 10.1" is operatively coupled to the image projector 14.

The split-ring projector-attachment structure 30, 30" incorporates a pair of internally-threaded bosses 52 that depend from the first arcuate portion 30.1 of the split-ring projector-attachment structure 30, 30", and that provide for engaging with corresponding sockets 54 located on the rear side 28.1" of the accessory-interface structure 28, 28", and that provide for receiving attachment screws 36 from the front side 28.2" of accessory-interface structure 28, 28" via corresponding through-holes 56 therethrough, so as to provide for operatively coupling the accessory-interface structure 28, 28" to the split-ring projector-attachment structure 30, 30", and thereby clamp the associated front housing 20 of the image projector 14 therebetween. In accordance with one set of embodiments, the internally-threaded bosses 52 are located sufficiently high within the opening 22 so as to provide clearance for the projector lens 18 of the image projector 14.

The circumferential span of the split-ring projector-attachment structure 30, 30" is sufficiently great so as to provide for the split-ring projector-attachment structure 30, 30" to be retained within the opening 22 following the initial installation therewithin, at a position that is sufficiently close to the final position so that the internally-threaded bosses 52 of the split-ring projector-attachment structure 30, 30" can readily engage with the corresponding sockets 54 on the rear side 28.1" of the accessory-interface structure 28, 28", thereby provide for insertion and threaded engagement of the associated attachment screws 36.

One or more tines 58—for example, a pair of tines 58—located at the base of the accessory-interface structure 28, 28" provide for capturing the base of the split-ring projector-attachment structure 30, 30" against the front surface 20.1 of the front housing 20 prior to securing the upper portion of the accessory-interface structure 28, 28" to the internally-threaded bosses 52 of the split-ring projector-attachment structure 30, 30" with the associated attachment screws 36. More particularly, after inserting the split-ring projector-attachment structure 30, 30" into the opening 22 of the front housing 20, the base of the accessory-interface structure 28, 28" is inserted into the opening 22 through the gap 60 at the base of the split-ring projector-attachment structure 30, 30" so as to engage the forward surfaces 58.1 of the one or more tines 58 against corresponding rear-facing surface or surfaces 20.2 of the front housing 20, after which the accessory-interface structure 28, 28" is secured to the split-ring projector-attachment structure 30, 30" by screwing the attachment screws 36 into the corresponding internally-threaded bosses 52. The accessory-interface structure 28, 28" further incorporates a conical surface portion 62 that provides for abutting the conical, front-facing surface 20.3 of the front housing 20 and thereby clamping the front housing 20 between the conical surface portion 62 of the accessory-interface structure 28, 28" and at the least one first arcuate segment 30.2 of the split-ring projector-attachment structure 30, 30" responsive to tension in the attachment screws 36.

The accessory-interface structure 28, 28" further incorporates a plurality of ventilation ports 64 therethrough that provide for admitting a flow of ventilation air to the image projector 14 responsive thereto during operation thereof.

In one set of embodiments, the split-ring projector-attachment structure 30, 30" and the accessory-interface structure 28, 28" are each manufactured by 3D printing, for example, for the accessory-interface structure 28, 28", starting with the rear side 28.1" thereof, which incorporates a periodic grooved structure 66 for cosmetic purposes to hide imperfections associated with the 3D manufacturing process.

Referring to FIGS. 19-22, in accordance with a second aspect 10.2, an accessory-attachment adapter 10, 10.2 provides for attaching an accessory-interface structure 28 to a front housing 20, 20' of an image projector 14 for which the radial gap 31 between the projector lens 18 and the radially-inside edge 22' of the opening 22 in the front housing 20, 20' is insufficient to provide for the insertion therethrough of a projector-attachment structure 30, 30', 30" of a first-aspect accessory-attachment adapter 10, 10.1, 10.1', 10.1" in order to provide for making contact with a rear-facing surface 20.2 of the front housing 20, 20' proximate to the opening 22 therethrough, but for which the front housing 20, 20' otherwise incorporates other openings 68 therethrough, —for example, located proximate to the opening 22 for the projector lens 18, —for example, openings 68' associated with a ventilation grill portion 70 in, or of, the front housing 20, 20' of an image projector 14.

More particularly, as one example, in the embodiment illustrated in FIGS. 19-22, an accessory-interface structure 28, 28''' includes two or more slotted holes 72 through which corresponding projector-attachment structures 30, 30''' can be inserted to provide for attachment of the accessory-interface structure 28, 28''' to the front housing 20, 20' of the image projector 14 via corresponding openings 68, 68' in a ventilation grill portion 70 thereof. For example, in one set of embodiments, each projector-attachment structure 30, 30''' is a type of quarter-turn fastener comprising a cylindrical shank portion 74, an elongate base portion 76, and a head portion 78, For each projector-attachment structure 30, 30''' and associated slotted hole 72 and opening 68, 68', the diameter of the cylindrical shank portion 74 and the width (i.e. minimum transverse dimension) of the elongate base portion 76 is sized to fit through both the slotted hole 72 and the opening 68, 68', the length (i.e. maximum transverse dimension) of the elongate base portion 76 is sized to fit through the slotted hole 72 and to engage with the structure of the front housing 20, 20'/ventilation grill portion 70 adjacent to the opening 68, 68' when the projector-attachment structure 30, 30''' is rotated a quarter turn following insertion through the opening 68, 68', and the diameter of the head portion 78 is greater than the width (i.e. minimum transverse dimension) of the slotted hole 72 so as to provide for the accessory-interface structure 28, 28''' to be clamped by the head portion 78 following installation of the projector-attachment structure 30, 30". For example, the elongate base portion 76 may be either symmetric or asymmetric relative to the cylindrical shank portion 74, for example, including combinations thereof that are either "T"-shaped, or "J"- or "L"-shaped. The head portion 78 incorporates either a slot 80, a prismatic socket, a prismatic shape, or some other feature for mating with a tool so as to provide for turning the projector-attachment structure 30, 30''' during installation thereof.

During installation of the accessory-interface structure 28, 28''' on the front housing 20, 20' of the image projector 14, each projector-attachment structure 30, 30''' is oriented with the elongate base portion 76 aligned with a corresponding slotted hole 72 in the accessory-interface structure 28, 28''' and with a corresponding opening 68, 68' in the front housing 20, 20'/ventilation grill portion 70, and inserted therethrough until the head portion 78 thereof is in abutment with the outside surface of the accessory-interface structure 28, 28'', and the rear-facing surface of the accessory-interface structure 28, 28''' is in abutment with the front surface 20.1 of the front housing 20, 20'/ventilation grill portion 70, after which the projector-attachment structure 30, 30''' is rotated by a quarter-turn to provide for engaging the elongate base portion 76 with the structure of the front housing 20, 20'/ventilation grill portion 70 adjacent to the opening 68, 68', thereby clamping the resulting assembly of the front housing 20, 20'/accessory-interface structure 28, 28''' between the elongate base 76 and head 78 portions of the projector-attachment structure 30, 30". A subsequent unintended rotation of the projector-attachment structure 30, 30''' can be mitigated by either sufficient inherent friction or interference within the joint, or an associated detent mechanism. The associated clamping pressure can be increased by ramping the forward-facing surface 76.1 so that the distance between that surface 76.1 and the underside of the head portion 78—between which the front housing 20, 20' and accessory-interface structure 28, 28''' are clamped—decreases with increasing rotation of the projector-attachment structures 30, 30''' during installation thereof. Alternatively, or additionally, a spring washer could be incorporated under the head portion 78 of the projector-attachment structures 30, 30'''. Alternatively, the projector-attachment structures 30, 30''' could incorporate the cylindrical shank portion 74 together with the elongate base portion 76 in one component that incorporates an internally threaded hole, the latter of which cooperates with a separate screw that incorporates the associated head portion 78, with the length of the cylindrical shank portion 74 sufficiently short so as to provide for increasing the associated clamping pressure by tightening the screw following insertion and rotation of the elongate base portion 76, the latter made possible by sufficient friction within the associated threaded joint. Further alternatively, the cylindrical shank portion 74 may incorporate a threaded end to receive a nut, or a nut with a washer, that acts as the associated head portion 78. The front side 28.1''' of the accessory-interface structure 28, 28''' incorporate a plurality of either threaded holes 82, threaded studs 84, or a combination thereof, so as to provide for attaching an image-projector accessory 12 thereto.

It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. An image-projector accessory-attachment adapter for attaching an image-projector accessory to an image projector, comprising:
    a. an accessory-interface structure, and
    b. at least one projector-attachment structure, wherein said at least one projector-attachment structure provides for attaching to the image projector by clamping to a region of a front housing portion of said image projector, said at least one projector-attachment structure is operatively couplable to said accessory-interface structure; and said accessory-interface structure provides for attaching to the image-projector accessory so as to provide for attaching said image-projector accessory to said image projector via said at least one projector-attachment structure, wherein said region of said front housing portion is associated with an opening therethrough for projection of an associated beam of light from said image projector, wherein said accessory-interface structure is operatively coupled to each projector-attachment structure of said at least one projector-attachment structure with at least one fastener, wherein at least one said at least one fastener operatively coupling said at least one projector-attachment structure to said accessory-interface structure is located above a center of a projector lens of said image projector, and wherein said accessory-interface structure incorporates at least one tine proximate to a base portion of said accessory-interface structure, a forward-facing portion of which provides for engaging with a rearward-facing portion of said front housing portion through a base portion of said opening through said front housing portion of said image projector.

2. An image-projector accessory-attachment adapter for attaching an image-projector accessory to an image projector as recited in claim 1, wherein said image-projector accessory is an optical device selected from the group consisting of a filter, an optical window, a non-anamorphic lens, and an anamorphic lens.

3. An image-projector accessory-attachment adapter for attaching an image-projector accessory to an image projector as recited in claim 1, wherein said accessory-interface structure incorporates one or more vent openings that provide for a flow of ventilation air therethrough to said image projector responsive thereto during operation thereof.

4. An image-projector accessory-attachment adapter for attaching an image-projector accessory to an image projector as recited in claim 1, wherein upon the operative coupling of said at least one projector-attachment structure to said accessory-interface structure, at least one at-least-partially-front-facing surface of said at least one projector-attachment structure clamps against a corresponding at least one at-least-partially-rear-facing surface of said front housing portion of said image projector surrounding said opening therethrough, and at least one at-least-partially-rear-facing surface of said accessory-interface structure clamps against a corresponding at least one at-least-partially-front-facing surface of said front housing portion of said image projector surrounding said opening therethrough.

5. An image-projector accessory-attachment adapter for attaching an image-projector accessory to an image projector as recited in claim 1, wherein the operative coupling of said at least one projector-attachment structure to said accessory-interface structure provides for resisting relative motion of said accessory-interface structure relative to said image projector.

6. An image-projector accessory-attachment adapter for attaching an image-projector accessory to an image projector as recited in claim 1, wherein said accessory-interface structure provides for pivotally attaching to a lens assembly about an associated pivot axis that is transverse to an optical axis of said image projector along which said associated beam of light is projected.

7. An image-projector accessory-attachment adapter for attaching an image-projector accessory to an image projector as recited in claim 6, wherein said accessory-interface structure provides for locking an angular orientation of said lens assembly about said associated pivot axis.

8. An image-projector accessory-attachment adapter for attaching an image-projector accessory to an image projector as recited in claim 1, wherein said projector lens of said image projector extends through said opening through said front housing portion of said image projector, and said at least one projector-attachment structure axially extends through a radial gap between an outside of said projector lens and an inside of said opening through said front housing portion.

9. An image-projector accessory-attachment adapter for attaching an image-projector accessory to an image projector as recited in claim 1, wherein when assembled to said image projector, a front-most portion of said at least one projector attachment structure is recessed relative to said accessory-interface structure.

10. An image-projector accessory-attachment adapter for attaching an image-projector accessory to an image projector as recited in claim 1, wherein a transverse position of at least one said at least one projector-attachment structure is adjustable relative to said accessory-interface structure.

11. An image-projector accessory-attachment adapter for attaching an image-projector accessory to an image projector as recited in claim 1, wherein each said at least one fastener cooperates with a corresponding threaded hole in said at least one projector-attachment structure.

12. An image-projector accessory-attachment adapter for attaching an image-projector accessory to an image projector as recited in claim 1, wherein said at least one projector-attachment structure comprises at least two projector-attachment structures that are located around said opening so as to provide for resisting both translation and rotation of said accessory-interface structure relative to said image projector when said accessory-interface structure is operatively coupled to said image projector via said at least one projector-attachment structure.

13. An image-projector accessory-attachment adapter for attaching an image-projector accessory to an image projector as recited in claim 12, wherein at least one of said at least one projector-attachment structure is integral with said accessory-interface structure.

14. An image-projector accessory-attachment adapter for attaching an image-projector accessory to an image projector, comprising:
  a. an accessory-interface structure, and
  b. at least one projector-attachment structure, wherein said at least one projector-attachment structure provides for attaching to the image projector by clamping to a region of a front housing portion of said image projector, said at least one projector-attachment structure is operatively couplable to said accessory-interface structure; and said accessory-interface structure provides for attaching to the image-projector accessory so as to provide for attaching said image-projector accessory to said image projector via said at least one projector-attachment structure, wherein said region of said front housing portion is associated with an opening therethrough for projection of an associated beam of light from said image projector, wherein said accessory-interface structure is operatively coupled to each projector-attachment structure of said at least one projector-attachment structure with at least one fastener, and wherein said at least one projector-attachment structure is arcuately shaped and extends over a circumferential span, a first portion of said at least one projector-attachment structure provides for axially extending through said opening through said front housing portion of said image projector, said at least one projector-attachment structure incorporates, on a rear side thereof, at least one first arcuate segment having a diameter greater than a diameter of said opening, said at least one first arcuate segment provides for abutting a rear surface of said front housing portion of said image projector, said at least one projector-attachment structure incorporates, on a front side thereof, at least one second arcuate segment having a diameter greater than said diameter of said opening, and said at least one second arcuate segment provides for abutting a front surface of said front housing portion of said image projector.

15. An image-projector accessory-attachment adapter for attaching an image-projector accessory to an image projector as recited in claim 14, wherein at least one said at least one fastener operatively coupling said at least one projector-attachment structure to said accessory-interface structure is located above a center of a projector lens of said image projector.

16. An image-projector accessory-attachment adapter for attaching an image-projector accessory to an image projector as recited in claim 14, wherein said circumferential span of said at least one projector-attachment structure is sufficient so that said first portion of said at least one projector-attachment structure and said at least one first arcuate segment in cooperation with said accessory-interface structure provide for resisting both translation and rotation of said accessory-interface structure relative to said image projector when said accessory-interface structure is operatively coupled to said image projector via said at least one projector-attachment structure.

17. An image-projector accessory-attachment adapter for attaching an image-projector accessory to an image projector as recited in claim 14, wherein said image-projector accessory is an optical device selected from the group consisting of a filter, an optical window, a non-anamorphic lens, and an anamorphic lens.

18. An image-projector accessory-attachment adapter for attaching an image-projector accessory to an image projector as recited in claim 14, wherein said accessory-interface structure incorporates one or more vent openings that provide for a flow of ventilation air therethrough to said image projector responsive thereto during operation thereof.

19. An image-projector accessory-attachment adapter for attaching an image-projector accessory to an image projector as recited in claim 14, wherein upon the operative coupling of said at least one projector-attachment structure to said accessory-interface structure, at least one at-least-partially-front-facing surface of said at least one projector-attachment structure clamps against a corresponding at least one at-least-partially-rear-facing surface of said front housing portion of said image projector surrounding said opening therethrough, and at least one at-least-partially-rear-facing surface of said accessory-interface structure clamps against a corresponding at least one at-least-partially-front-facing surface of said front housing portion of said image projector surrounding said opening therethrough.

20. An image-projector accessory-attachment adapter for attaching an image-projector accessory to an image projector as recited in claim 14, wherein the operative coupling of said at least one projector-attachment structure to said accessory-interface structure provides for resisting relative motion of said accessory-interface structure relative to said image projector.

21. An image-projector accessory-attachment adapter for attaching an image-projector accessory to an image projector as recited in claim 14, wherein said accessory-interface structure provides for pivotally attaching to a lens assembly about an associated pivot axis that is transverse to an optical axis of said image projector along which said associated beam of light is projected.

22. An image-projector accessory-attachment adapter for attaching an image-projector accessory to an image projector as recited in claim 21, wherein said accessory-interface structure provides for locking an angular orientation of said lens assembly about said associated pivot axis.

23. An image-projector accessory-attachment adapter for attaching an image-projector accessory to an image projector as recited in claim 14, wherein said projector lens of said image projector extends through said opening through said front housing portion of said image projector, and said at least one projector-attachment structure axially extends through a radial gap between an outside of said projector lens and inside of said opening through said front housing portion.

24. An image-projector accessory-attachment adapter for attaching an image-projector accessory to an image projector as recited in claim 14, wherein when assembled to said image projector, a front-most portion of said at least one projector-attachment structure is recessed relative to said accessory-interface structure.

25. An image-projector accessory-attachment adapter for attaching an image-projector accessory to an image projector as recited in claim 14, wherein a transverse position of at least one said at least one projector-attachment structure is adjustable relative to said accessory-interface structure.

26. An image-projector accessory-attachment adapter for attaching an image-projector accessory to an image projector as recited in claim 14, wherein each said at least one fastener cooperates with a corresponding threaded hole in said at least one projector-attachment structure.

27. An image-projector accessory-attachment adapter for attaching an image-projector accessory to an image projector as recited in claim 14, wherein said at least one projector-attachment structure comprises at least two projector-attachment structures that are located around said opening so as to provide for resisting both translation and rotation of said accessory-interface structure relative to said image projector when said accessory-interface structure is operatively coupled to said image projector via said at least one projector-attachment structure.

28. An image-projector accessory-attachment adapter for attaching an image-projector accessory to an image projector as recited in claim 27, wherein at least one of said at least one projector-attachment structure is integral with said accessory-interface structure.

\* \* \* \* \*

UNITED STATES PATENT AND TRADEMARK OFFICE
CERTIFICATE OF CORRECTION

| | | |
|---|---|---|
| PATENT NO. | : 11,635,676 B2 | Page 1 of 1 |
| APPLICATION NO. | : 17/384723 | |
| DATED | : April 25, 2023 | |
| INVENTOR(S) | : Shawn L. Kelly | |

It is certified that error appears in the above-identified patent and that said Letters Patent is hereby corrected as shown below:

On the Title Page

Item (56) References Cited, US PATENT DOCUMENTS:
For U.S. PATENT DOCUMENT 6,416,184, "Arai" should be replaced with --Arai et al.--;
For U.S. PATENT DOCUMENT 2005/0259230, "Yang" should be replaced with --Yang et al.--; and
For U.S. PATENT DOCUMENT 2007/0024826, "Gilbert" should be replaced with --Gilbert et al.--.

In the Specification

Column 10 at Lines 21 and 49, "30"." should be replaced with --30'".--.
Column 10 at Line 39, "28"," should be replaced with --28'",--.

Signed and Sealed this
Twentieth Day of June, 2023

*Katherine Kelly Vidal*

Katherine Kelly Vidal
*Director of the United States Patent and Trademark Office*